(12) United States Patent
Epstein et al.

(10) Patent No.: US 8,392,314 B1
(45) Date of Patent: Mar. 5, 2013

(54) METHODS AND SYSTEMS FOR COMPUTER-BASED INCREMENTAL TRADING

(75) Inventors: Daniel Epstein, Short Hills, NJ (US); Rajesh Mani, Woodbridge, NJ (US); Yuriy Metelev, Staten Island, NY (US)

(73) Assignee: MarketAxess Holdings, Inc., New York, NY (US)

( * ) Notice: Subject to any disclaimer, the term of this patent is extended or adjusted under 35 U.S.C. 154(b) by 271 days.

(21) Appl. No.: 12/698,540

(22) Filed: Feb. 2, 2010

Related U.S. Application Data

(60) Provisional application No. 61/149,213, filed on Feb. 2, 2009.

(51) Int. Cl.
*G06Q 40/00* (2012.01)
(52) U.S. Cl. ............................................. 705/37; 705/35
(58) Field of Classification Search ...................... 705/37
See application file for complete search history.

(56) References Cited

U.S. PATENT DOCUMENTS

| | | | | |
|---|---|---|---|---|
| 7,831,504 B1 * | 11/2010 | Cleaves et al. | ................... | 705/37 |
| 8,005,745 B1 * | 8/2011 | Cleaves et al. | ................... | 705/37 |
| 2009/0276348 A1 * | 11/2009 | Kessler et al. | ................... | 705/37 |

* cited by examiner

*Primary Examiner* — Jason M Borlinghaus
*Assistant Examiner* — Hao Fu
(74) *Attorney, Agent, or Firm* — Proskauer Rose LLP

(57) ABSTRACT

Methods and systems for computer-based incremental trading are provided. Owners of the top price/time priority orders are able to trade between each other multiple numbers of times prior to the expiration of a workup period, at which time the workup orders of all the users participating in the workup are matched. The workup period is private between the owners of the top price/time priority orders and the orders are allowed to be modified multiple times. When the workup period ends, orders are matched according to the original price/time priority.

30 Claims, 21 Drawing Sheets

METHODS AND SYSTEMS FOR COMPUTER-BASED INCREMENTAL TRADING

CROSS-REFERENCE TO RELATED APPLICATION

This application claims priority under 35 U.S.C. §119(e) to U.S. Provisional Patent Application No. 61/149,213, filed on Feb. 2, 2009, entitled METHODS AND SYSTEMS FOR COMPUTER-BASED TRADING, the contents of which are incorporated herein in their entirety by reference.

FIELD OF THE INVENTION

The present invention relates to systems and methods for trading financial or commodity assets. In particular, the invention relates to a trading system and method that enables original counterparties to a trade to have exclusive ability to trade between each other multiple numbers of times prior to the expiration of a workup period.

BACKGROUND OF THE INVENTION

There exist a number of marketplaces for financial or commodity assets that are not organized on exchanges such as the New York Stock Exchange or the Chicago Board of Trade. Rather, these markets are more fragmented, "over-the-counter" (OTC) markets. Some of the largest markets in the world, such as the markets for U.S. Treasury Bills, Notes, and Bonds, are not exchange traded and instead are typically served by market-makers who are dealers in the securities or commodities, and provide markets to customers who are not themselves market-makers. Market-makers ("Dealers") also deal with each other in order to manage their market risk and inventories of tradable assets. Trading activity in such markets can be broadly divided into two segments: (1) Interdealer trading, and (2) Dealer-to-customer trading. For example, The Federal Reserve Bank of New York reports the trading activity of Primary Dealers in U.S. Treasury securities in two categories: Transactions with Interdealer brokers; and Transactions with Others.

Dealers and customers ("Clients") of Dealers traditionally trade with each other in non-exchange based markets. The non-exchange markets allow the Clients to inquire on prices of particular assets from Dealers and choose whether to trade the assets at those prices. Sometimes a Client will receive a price and then negotiate further to reach a final price. In this context, clients are often referred to as "price-takers" and Dealers as "price-makers." One of the reasons for an inquiry-based behavior is that away from an exchange, market pricing is not entirely transparent to all parties. Clients need to make inquiries to discover with certainty prices available for trading a particular asset.

Even with electronic innovations in Client-to-Dealer trading, the marketplace has largely remained bound to traditional patterns of Client-to-Dealer relationships. Electronic Client-to-Dealer trading of U.S. Treasury and Corporate bonds, for example, typically takes the form of inquiries sent by a Client to one or more Dealers. Dealers typically respond with prices that are executable for certain periods of time, and the Dealers may update these prices for a limited period of time as part of their response to the inquiry. Electronic trading has improved the efficiency of the price discovery and trade settlement processes, but has not fundamentally changed the dialog of the trading process. Some systems do permit Clients to send an order with an executable price to a Dealer. In these the Dealer is authorized to execute a trade without further communication with the Client, but with limitations such as the number of dealers that may be utilized and/or the time period for executing the order.

Electronic innovations have proceeded in parallel and separate paths in the two separate market segments of interdealer trading and Client-to-Dealer trading. Interdealer trading in large liquid but non-exchange traded markets such as spot foreign exchange, and U.S. Treasuries may utilize fully electronic cross-matching systems operated by interdealer brokers whose operation resembles that of electronic futures exchanges or equity electronic crossing networks ("ECNs") even though they are not actually exchange markets. These fully electronic interdealer broker ("IDB") markets provide continuous liquidity and an executable quality level of transparency. That is, it is possible to see levels with associated quantities that actually can be executed in real-time over a continuous period of time for those quantities shown.

Electronic trading systems in Client-to-Dealer trading on the other hand, particularly multi-dealer systems, do not provide continuous liquidity and full transparency. Systems that do provide continuous liquidity do so only at levels fixed by the Dealer(s) and do not allow the Client to specify their own price to for the purpose of continuous order matching. Transparency is typically limited to indicative levels that may or may not show quantity information. These pricing levels may be near executable levels and updated frequently, or they may be periodic updates such as twice a day. Clients send an inquiry when they have a trading interest, such as to buy bonds, and typically dealers respond with prices that are good for a short period of time (e.g., a few seconds) that may automatically update in order to slightly extend the period of time that prices are available for execution. Frequently, upon receiving an electronic inquiry, the Dealer automatically responds to the Client with an executable price. The executable price can be generated using a process that utilizes third-party market data such as prices from the electronic IDB market and proprietary data such as the Dealer's database of pricing relationships. The database can include pricing relationships between more liquid benchmark securities and less liquid securities that are priced based upon the levels of the benchmark securities.

Clients obtain reasonably competitive execution by sending inquiries to multiple dealers and comparing responses when they return. This execution, however, is competitive only for the instant in time when the client sends the inquiry. The timing characteristics of such inquiry models do not directly support more "patient" trading strategies that are considered a vital part of trading on exchanges, or even in trading in the IDB markets for non-exchange based products. Patient trading sacrifices the certainty of immediate execution for the possibility of achieving a better price through the general volatility of the market. Patient trading also gives Dealers the ability to find more matching interests that may enable them to fill a Client order with less risk and possibly cost to themselves; producing a more favorable trade execution for the Client.

There are a variety of reasons for the separate nature of the electronic IDB markets and electronic Client-to-Dealer trading. IDB markets are typically anonymous and often clear their trades through a central netting counterparty in order to reduce cost and risk for market participants. Clients often do not wish to trade anonymously because they prefer to know their counterparty, and Clients are often not eligible to participate in central netting arrangements. This is especially true when such nets involve mutualization of risk which institutional investors, such as mutual funds, are not typically permitted to engage in by their own bylaws. Thus, Client-to-Dealer trading systems do not provide the Client with the quality-of-execution benefits of the fully electronic IDB systems such as access to continuous liquidity, transparency, trade matching opportunities, while at the same time retaining the desired characteristics of traditional Client-to-Dealer trading such as the flexibility to execute non round-lot amounts and the ability to trade on a disclosed relationship basis.

SUMMARY OF THE INVENTION

Certain embodiments of the present invention provide owners of the top price/time priority orders the ability to trade between each other multiple number of times prior to the expiration of a workup period, at which time the workup orders of all the users participating in the workup are matched. The workup period is private between the owners of the top price/time priority orders and the orders are allowed to be modified multiple times. When the workup period ends, orders are matched according to the original price/time priority and the amounts on the screen of each user before the workup was triggered. The modifications to the orders of the primary counterparties during the workup period are filled after the original orders of both the primary and secondary counterparties are matched.

Certain alternative embodiments of the present invention provide users of the trading platform the ability to view on their live screen of executed and pending orders, information about the market depth of a transmitted order, the current view of all transmitted orders and executed trades, historical view of all transmitted orders and executed trades, bond instrument details, execution prices for the various bond instruments, yield for the bond instruments, and spread for the bond instruments.

Certain alternative embodiments of the present invention provide investors ("Clients"), who transact securities in an over-the-counter ("OTC") market (or other marketplace that is not an exchange) with the ability to reference and benefit from the transparency as well as continuous liquidity available in third party markets such as electronic interdealer broker markets ("IDBs") that serve the professional Dealers of the OTC market. The market-making function is improved for both Dealers and Clients by providing continuous real-time opportunities for trade matching between Dealers and Clients thereby improving liquidity and economic efficiency for both.

Some alternative embodiments may guarantee to investors and Dealers and/or enhance the matching process such that the matching process is fair and orderly by, for example, automatically providing price protection to any Client orders placed with Dealers. The price protection can guarantee that any potential trade matches for a given asset will occur within a price range controlled by the most competitive markets for that asset on an electronic IDB market. That is, the clearing price or execution of any Client order filled by a Dealer will occur within bounds automatically controlled by the TPIM, which is the highest bid and the lowest offer, available on the referenced electronic IDB market at the time of order execution.

Some alternative embodiments may also improve the liquidity discovery process for Clients through the use of rule-based processing to maximize the breadth of Dealer liquidity available to the Client at the moment the Client places an order. This process allows the Client to reach very broadly, and in a controlled manner, across the available Dealer set to attempt a trade match prior to pursuing the protected order process with Dealers as described above.

Certain alternative embodiments of the invention may include a method of financial trading comprising forwarding a client order to at least one exclusive dealer. The client order remains active for an exclusive time for possible execution by the at least one exclusive dealer. Upon expiration of the exclusive time, if the client order remains open a transition into an open phase occurs where the client order is forwarded to at least one permissioned dealer for execution by the at least one permissioned dealer. Upon expiration of an open period time, if the client order remains open a transition occurs into a protected order phase where automatic order protection (AOP) rules protect the client order.

Some alternative embodiments of the invention include a method of financial trading including forwarding a client order to at least one dealer, entering a protected order phase, applying order protection to the client order based on Third Party Market data, and modifying the client order based on at least one of the TPIM data and Third Party Data.

Certain alternative embodiments of the invention are a system for financial trading that includes a server. The server receives Third Party Data and is coupled to a client computer. The server provides Third Party Data to the client computer and the server receives client orders. A dealer computer is also coupled to the server. The server forwards client orders to the dealer computer and an automated order protection processor implemented in the server. The automated order protection processor determines whether to transition the client order to an order protection state based on Third Party Inside Market (TPIM) data, and the order protection processor modifies the client order based on at least one of TPIM data and Third Party Data.

Some alternative embodiments of the invention are a system for financial trading including a first means for providing a server. The first means receives third party data and is coupled to a second means for providing a client computer. The first means provides third party data to the second means and the first means receives client orders. A third means for providing a dealer computer is also coupled to the first means. The first means places client orders with the third means and a protection means for processing automatic order protection is implemented in the first means. The second means checks TPIM data against the client order to determine whether to apply order protection to the client order, and the order protection modifies a price level in the client order based on the TPIM data.

Certain alternative embodiments are a method of financial trading involving a client and at least one dealer that include forwarding the client order to at least one exclusive dealer. The client order remains active for an exclusive time for possible execution by the at least one exclusive dealer. Upon expiration of the exclusive time with the order remaining open a transition occurs into a protected order phase where automatic order protection (AOP) rules protect the client order.

In certain alternative embodiments, elements such as: an average weighted price function that calculates order protection levels using prices for at least one of bids and offers; an autofill function that fills a client of order when there is a price difference between a client and dealer; and a wait-for-follow processing that applies order protection if an inversion of TPIM levels relative to the client order level occurs can be combined either separately or as a set with any of the described embodiments.

BRIEF DESCRIPTION OF DRAWINGS

The detailed description of the present application showing various distinctive features may be best understood when the detailed description is read in reference to the appended drawing in which.

DETAILED DESCRIPTION OF THE INVENTION

Figure 1:
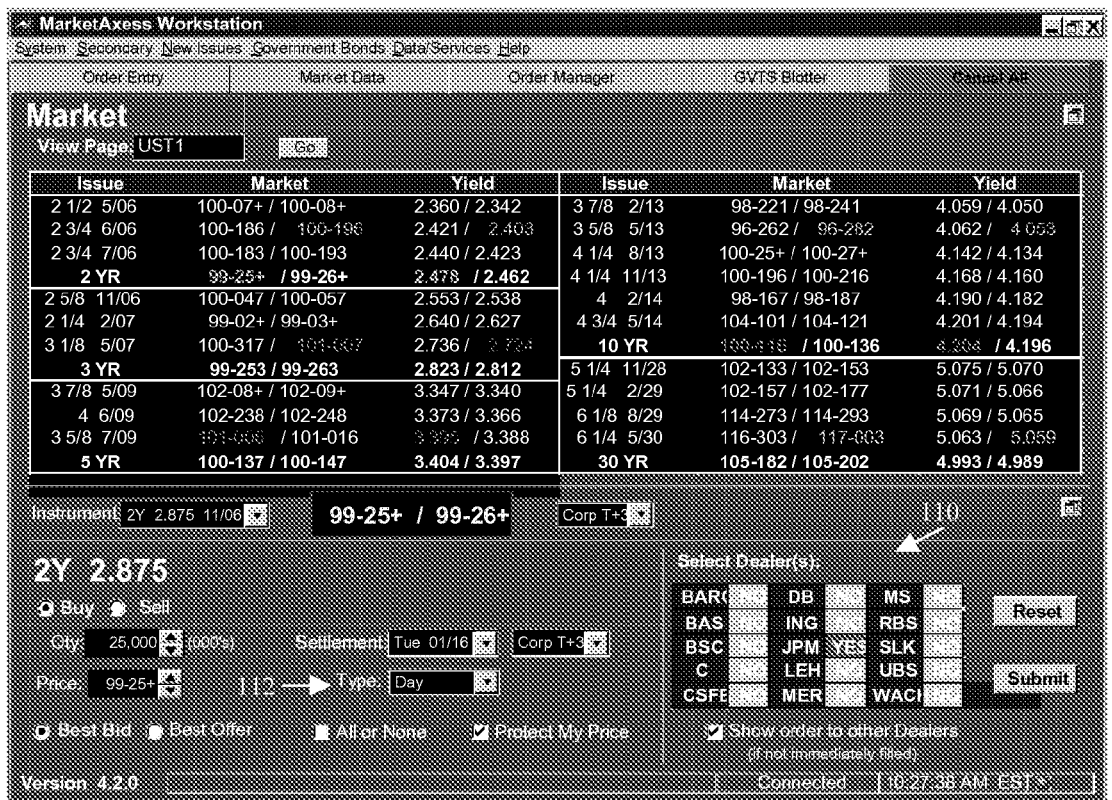
FIG. 1 illustrates a computer user interface that may be utilized by a Client in an embodiment of the invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Systems and methods of certain embodiments of the present invention relate to a computerized system that is operated by a third party intermediary. The computerized system provides new ways of processing transactions in government securities and enables more efficient transactions for investors. The system can be implemented to provide investor interface and/or trading screens on terminals or computers that reside on a local area network (LAN) or a wide area network (WAN) where remotely situated clients can communicate across a network with the third party intermediary. Clients, which are not limited to the ultimate investor such as fund managers and may include traders and brokers for executing transactions, are permitted to enter orders into the system. These orders may include setting a price limit at the level of the current best bid, best offer, or any level manually by the client.

Certain embodiments of the present invention provide owners of the top price/time priority orders the ability to trade between each other multiple number of times prior to the expiration of a workup period, at which time the workup orders of all the users participating in the workup are matched. The workup period is private between the owners of the top price/time priority orders and the orders are allowed to be modified multiple times. When the workup period ends, orders are matched according to the original price/time priority and the amounts on the screen of each user before the workup was triggered. The modifications to the orders of the primary counterparties during the workup period are filled after the original orders of both the primary and secondary counterparties are matched.

Certain alternative embodiments of the present invention provide users of the trading platform the ability to view on their live screen of executed and pending orders, information about the market depth of a transmitted order, the current view of all transmitted orders and executed trades, historical view of all transmitted orders and executed trades, bond instrument details, execution prices for the various bond instruments, yield for the bond instruments, and spread for the bond instruments.

Certain embodiments of the invention utilize executable market data or Third Party Data from a fully electronic market. This Third Party Data includes real-time trade data and price data that is executable by market participants who have direct access to the executable Third Party Data. The Third Party Data can be maintained and presented in visual form on trading screens to support a Clients' trading decision processes as shown, for example, in FIG. 1. Also, the Third Party Data can be used to control an automatic order protection mechanism that manages and possibly improves client orders within a system that manages the matching of Client and Dealer orders or trading interests as shown, for example, in FIG. 2. The Third Party Data can be combined with system market data or any other suitable market data to form Third Party Inside Market (TPIM) data. In some embodiments, TPIM can be the best bid with its size and best offer with its size, which is the tightest "inside" market found within the Third Party Data.

Figure 3:
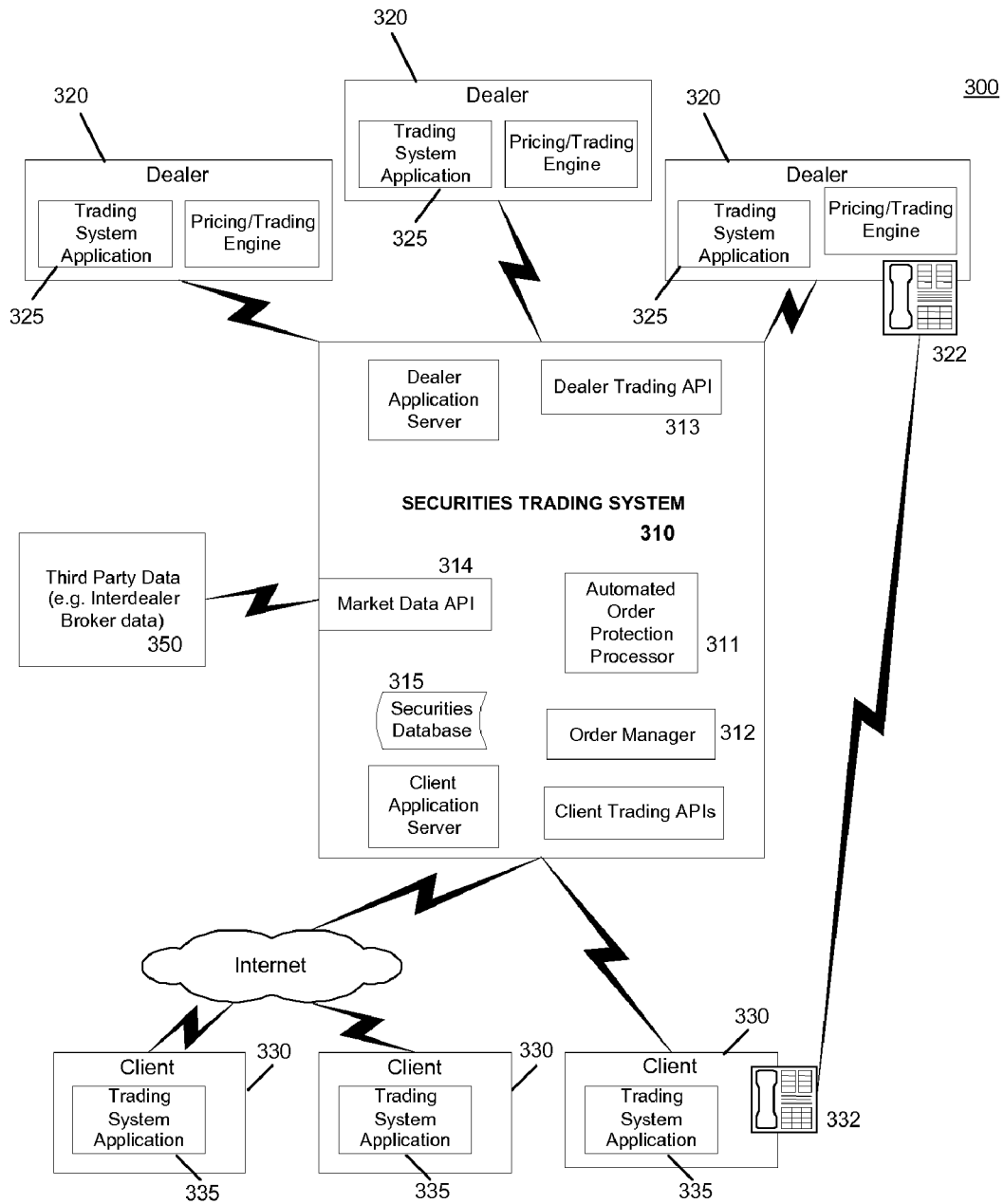
FIG. 3 illustrates the topology of an electronic trading system connecting Clients and Dealers according to an embodiment of the invention.

Referring now to FIG. 3, system 300 includes a software-enabled, computer-implemented trading system 310 for initiating transactions to serve Clients 330 which are not limited to the ultimate investor and may include traders and brokers for executing transactions in accordance with certain embodiments of the present invention. Although the trading system 310 is shown in FIG. 3 as occupying a central function between clients 330 and dealers 320, it is to be understood that this is a schematic representation, and may differ in other embodiments. As will be further explained hereinbelow, in some embodiments of the trading system 310 include components running at the premises of clients 330 and dealers 320. In some embodiments, trading system 310 may be implemented on a server or any other suitable device. Further, dealers 320 and clients 330 may represent human users interfacing with trading system application 325 and trading system application 335 which may be implemented on computers that interact with trading system 310 in some embodiments. Trading system application 325 can be tailored to the needs of client 330 and may provide a user interface for client 330 to access information provided by trading system 310 as well as to submit orders to trading system 310. Trading system application 335 can be a different interface than trading system application 325, or trading system applications 325 and 335 can provide dealer 320 and client 330 functionality. In certain embodiments, trading system application 325 is tailored to dealers 320 for responding to client 330 orders.

Trading system 310 is directed to data processing systems and methods for implementing trading rules that support transactions. A hardware arrangement with a plurality of processors, workstations, and network interfaces is one aspect of the invention. Transmission of client orders to trading system 310 can be accomplished in any manner. However, order information is preferably electronically effected via data transmission over secure private communication networks for links with Dealers' systems 320, and preferably via secured communication channels over Internet or private networks for links with Clients 330. Client orders can also include other information that describes or instructs trading system 310 on how to process the client order.

In some embodiments, trading system 310 provides a direct connection between it and one or more dealers 320. In other embodiments, transactions are conducted from Clients 330 to one or more dealers 320 through the intermediary of trading system 310. Trading system 310 may also be configured to transmit information of a transaction to a Clients' 330 or dealers' 320 in-house processing system for proper record-keeping and accounting. Transactions passing through the intermediary of trading system 310 can also be modified by trading system 310 before being forwarded to one or more dealers 320.

In operation trading system 310 attempts to find an optimal dealer 320 for each Client order. While locating the optimal or predetermined dealer 320 in a timely manner, trading system 310 may be subject to protection rules described below and others rules. For example, trading system 310 can implement various investment rules, such as contacting a minimum number of dealers before completing a transaction. The novel trading system 310 may fulfill these investment rules, which may be required by some institutional clients, by enabling rapid distribution of orders to dealers 320, and by providing quick and efficient mechanisms for evaluating, collating, and transmitting a number of order responses to client 330 for further action. The order responses can be automatically executed on behalf of client 330, if this is specified by client 330, or the order responses can be reviewed by client 330 and one or more order responses can be executed.

In some embodiments, orders are executed by reference to standardized information that uniquely identifies various financial securities generally available from a reference database. The reference database may be online and networked to trading system 310 or locally connected to trading system 310. Preferably, trading system 310 includes a local securities database 315, which stores descriptions of securities for future use whenever encountered by trading system 310. Securities database 315 can be primed or supplemented with preferred lists of security descriptions and has no particular limits. In some embodiments, the structure of the database 315 is substantially matched to fields utilized in trading system 310 and/or dealers' 320 and clients' 330 trading system application. Additionally, securities database 315 can be updated at a specified time period from a remote reference database, to keep it refreshed with the latest developments. The remote reference database may be a third party database, such as a government securities server, available through a network connection. In other embodiments, an event driven update may be used to maintain synchronicity of data fields between securities database 315 and the remote reference database. In an event driven update, when new or updated data is received at the remote reference database, this data is forwarded on to systems such as trading system 310.

In certain embodiments, trading system 310 allows clients 320 to enter orders in price increments that are finer than the minimum increments available for trading directly in the interdealer broker market which provides third party data 350. Third party data 350 can be used by trading system 310 to determine how a client's 320 order compares to other transaction data. For example, in an embodiment for trading in U.S. Treasuries, Clients 320 can enter orders in price units as small as ⅛ of 1/32nd even if the minimum trading increment for dealers on the IDB market is ½ of $1/32^{nd}$. Clients can enter finer increment orders because dealers 320 may be willing to fulfill transactions from their own supply of assets or can fulfill multiple client offers with an IDB trade.

Fulfillment and matching of Client 330 orders may occur within a matching facility logic operated within an Order Manager 312 and an Automated Order Protection Processor 311. As may be appreciated by one skilled in the art, order manager 312 and automated order protection processor 311 may be implemented in trading system 310 in any suitable manner and are not necessarily discrete hardware or software components. In some embodiments, prior to submitting an order, client 330 may be requested to select from one or more dealers 320 (possibly limited to a number such as five or as few as one) to whom the order is presented in section 110 of FIG. 1. Each selected dealer 320 may see the name and the order terms of client's 330 order. Orders may be executed partially or in their entirety according to the order terms set by client 330. Also, depending on the order type, (e.g. Fill-or-Kill or Day as shown FIG. 1 section 112) the selected dealer(s) 320 can have the opportunity to match against the order either instantaneously, and/or continuously until the order is filled or cancelled.

In some embodiments, orders are presented to a single dealer 320 and a Client's 330 order is actively managed by Automated Order Protection Processor 311 and Order Manager 312 relative to levels extracted from Third Party Data 350. Third party data 350 can be obtained from levels executing on the Interdealer Broker market. Transaction information from Third Party Data 350 is communicated to the Market Data API 314. Market Data API 314 can use the transaction information to extract levels at which particular securities are trading. Market Data API 314 may forward extracted information to Automated Order Protect (AOP) Processor 311 and/or Order Manager 312. AOP Processor 311 and/or Order Manager 312 can use information from Market Data API to modify or cancel client 330 orders. For example, if an order is unfavorable to client 320 based on the extracted information (that is, the order causes an inversion versus IDB market levels), then the order can be adjusted to stay consistent with current best levels in Third Party Data 350. Thus, AOP Processor 311 and/or Order Manager 312 can protect client 330 from off-market execution and may create opportunity for actual price improvement.

While the topology and architecture of trading system 310 is described above, the system also optionally utilizes software and other components to visually present Third Party Data 350 and to provide client 330 with the best possible trade execution among other things. Clients 330 may either: (1) enter orders within the current Third Party Inside Market on a particular asset with the hope of immediate execution, or; (2) enter orders outside of the current Third Party Inside Market with more "patient" trading strategies that favor price of execution over speed of execution. Third Party Data 350 is relevant and of sufficient quality to guide either of these strategies or other strategies that clients 330 may use when trading with dealers 330. Also, Third Party Data 350 can be used to control an automatic order protection and improvement mechanism for managing client orders within a system that manages the matching of client 330 and dealer 320 orders and/or trading interests.

Some embodiments of the present invention provide a user interface (see FIG. 1) for clients 330 to enter orders to buy or sell a single asset, or to simultaneously buy and sell a collection of assets in a single trade. The signal trade can be in two security trades such as swaps or rolls, or three asset combinations such as a "butterfly" where a short maturity and longer maturity bond might be bought and an intermediate maturity (in between the first two) might be sold. Additionally, client 330 orders may be entered as limit orders where client 330 specifies a price, a yield, or a spread limit to control the filling of the order. In certain embodiments, Third Party Data 350 allows client 330 to automatically enter a limit price at the level of the current best bid, best offer, or any level manually. If desired, client 330 orders can be entered by a dealer 320 salesperson using the interface of FIG. 1 on behalf of client 330 according to instructions received over telephone connection between a dealer salesperson at 322 and client 330 at 332.

In at least one embodiment, a client order must be filled at the client's level or better. The user interface may include an order panel (see FIG. 2 for an example) that supports the entry of price, spread, or yield based Limit Orders, with Time-in-Force options such as Fill-or-Kill, or Day, or Good-until-Cancelled. The system may also support the options for All-or-None or Partials Accepted with respect to the quantity specified in the client's order. Client 330 instructions communicated through trading system 310 and/or trading system application are hereinafter referred to as a Client Bid/Offer ("CBO") where client 330 bids to purchase or offers to sell an asset or combination of assets grouped together as a single synthetic asset. A CBO can also be considered a client order which may be a Bid or Offer and any instructions communicated to trading system 310 by client 330.

Figure 2:
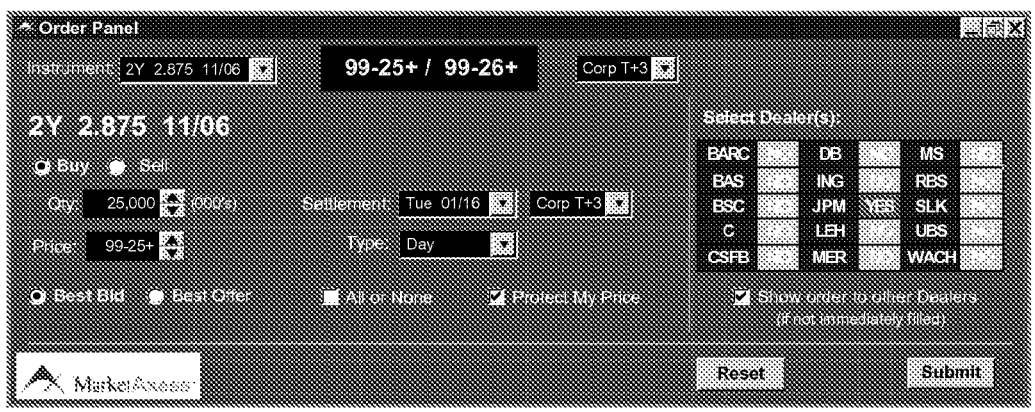
FIG. 2 illustrates an order panel for the computer user interface of FIG. 1 according to an embodiment of the invention.

In some embodiments, client 330 specifies a dealer 320 or group of dealers 320 that Client 330 prefers the order to be initially directed to as shown in FIG. 1 section 110. These dealers are referred to as the "Exclusive Dealers," which may be one or more dealers 320. In certain embodiments, client 330 can only select from among "Permissioned Dealers," dealers that client 330 has established an account with trading relationships, established credit lines, and obtained permission to transact on trading system 310 with optional credit line restrictions for such trading. Trading system 310 may maintain these relationships, permissions, and credit limits.

Client 330 can optionally and additionally select a second set of dealers from among the Permissioned Dealers, with whom the client participates with in Open phase matching, as described below. In some embodiments, the system can retain Open phase matching preferences with a default setting available so that client 330 does not need to re-enter this information with each order.

In one embodiment, order matching occurs based on standard time and priority rules. In an alternative embodiment, order matching occurs based on matching of order conditions.

Figure 4:
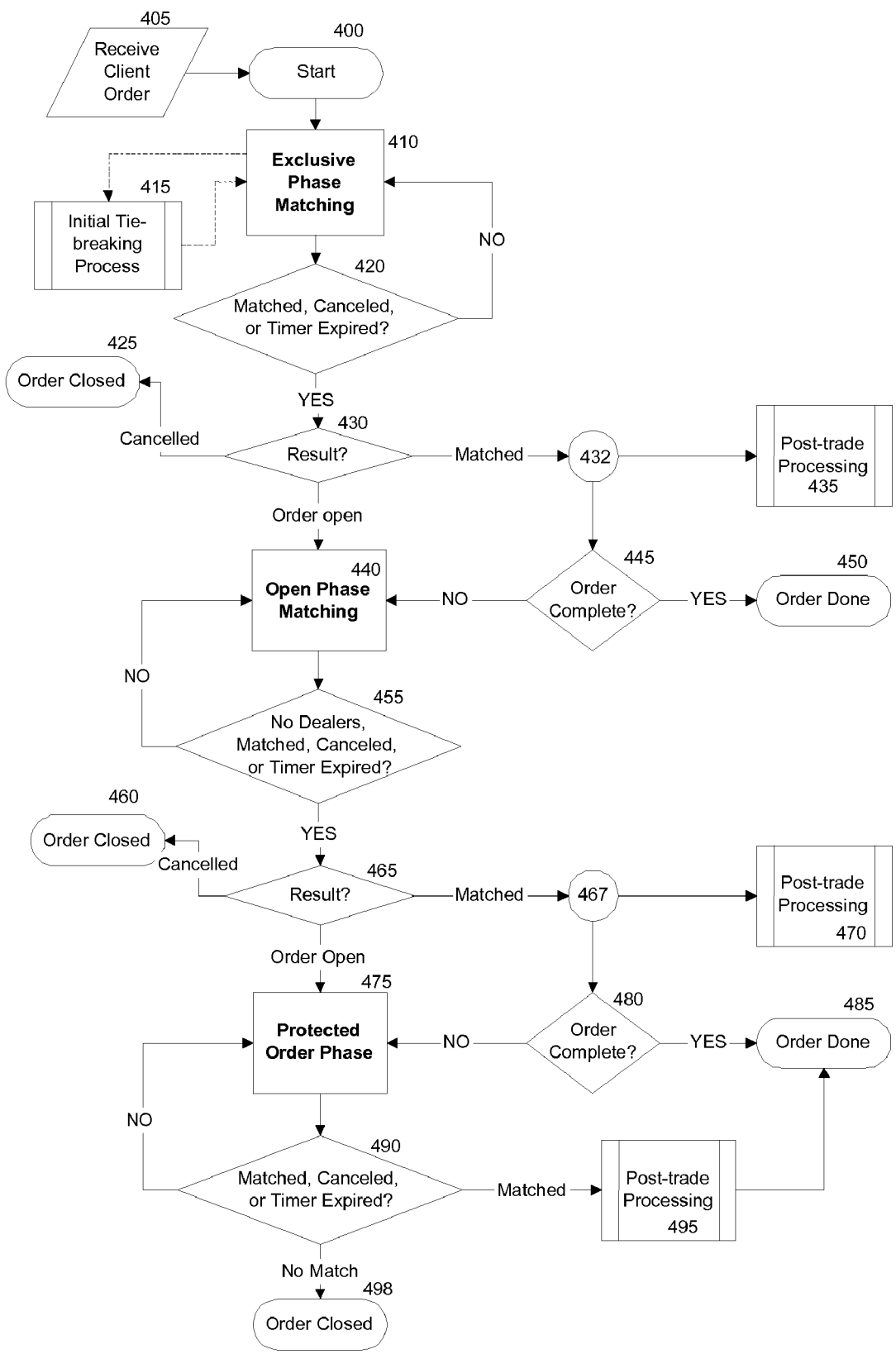
FIG. 4 is a flowchart showing an order matching method according to an embodiment of the invention.

In another optional embodiment, order matching can occur, for example, in one or more alternative distinct phases:
An Exclusive Matching state
An Open Matching state
A Protected Order state FIG. 4 illustrates a sequence of steps followed in flowing through these three phases in accordance with certain embodiments of the invention. Trading system 310, in conjunction with Order Manager 312, initiates the sequence at step 400, upon receiving an order or CBO, at step 405, that client 330 has entered into the system. In Exclusive Phase Matching step 410, trading system 310 attempts to match the terms of the CBO with the terms advertised by the Exclusive Dealers. The Exclusive Dealers may have a limited period of time ("Exclusive Time") within which to transmit into the system a matching counter-order. This time period may be configured by client 330 within a system defined range. The exclusive matching process may be fully automated, with the dealers utilizing the trading system APIs 313 for this purpose.

Figure 8:
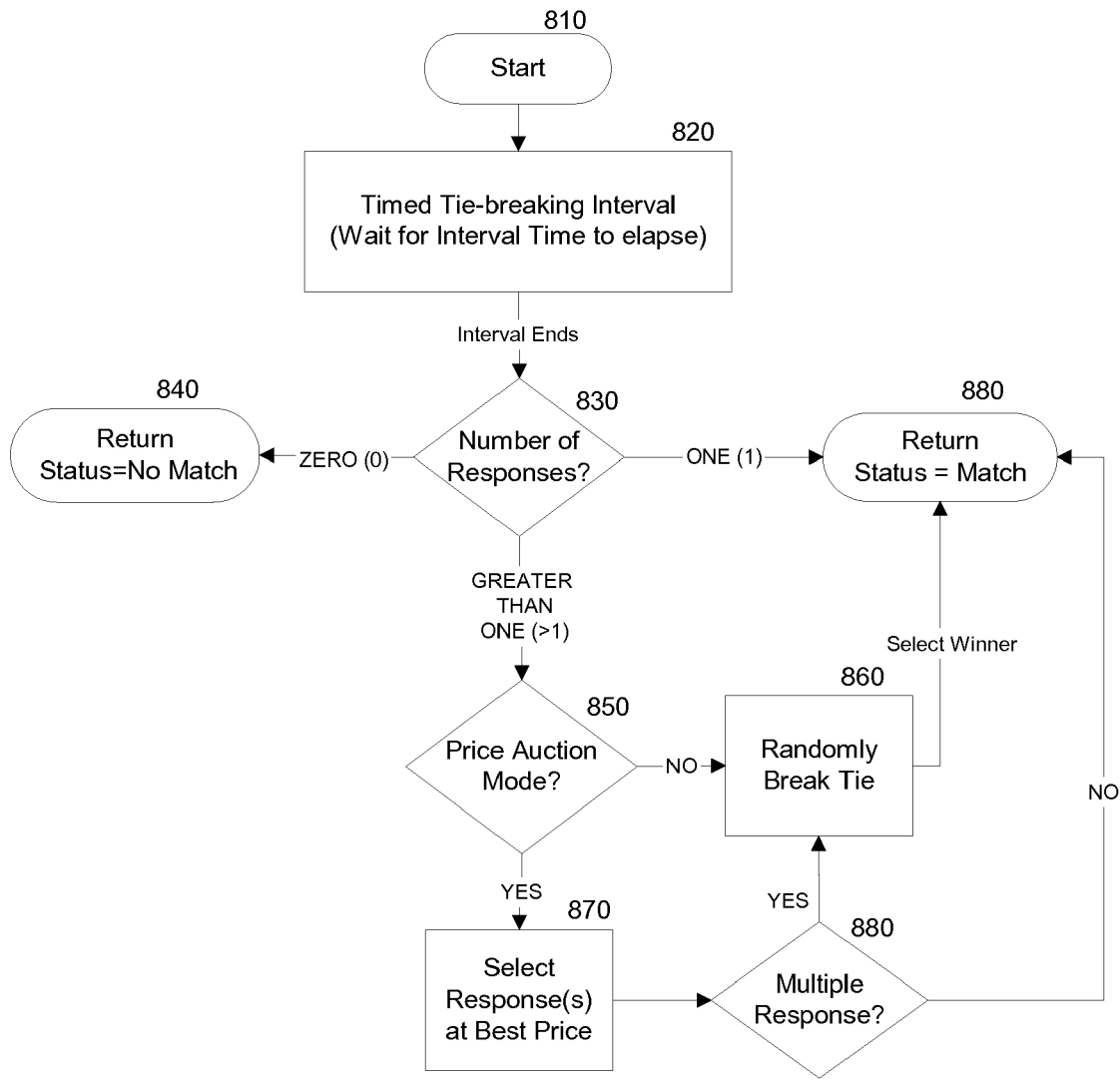
FIG. 8 is a flowchart showing further details of the exclusive phase matching method according to an embodiment of the invention.
Figure 9:
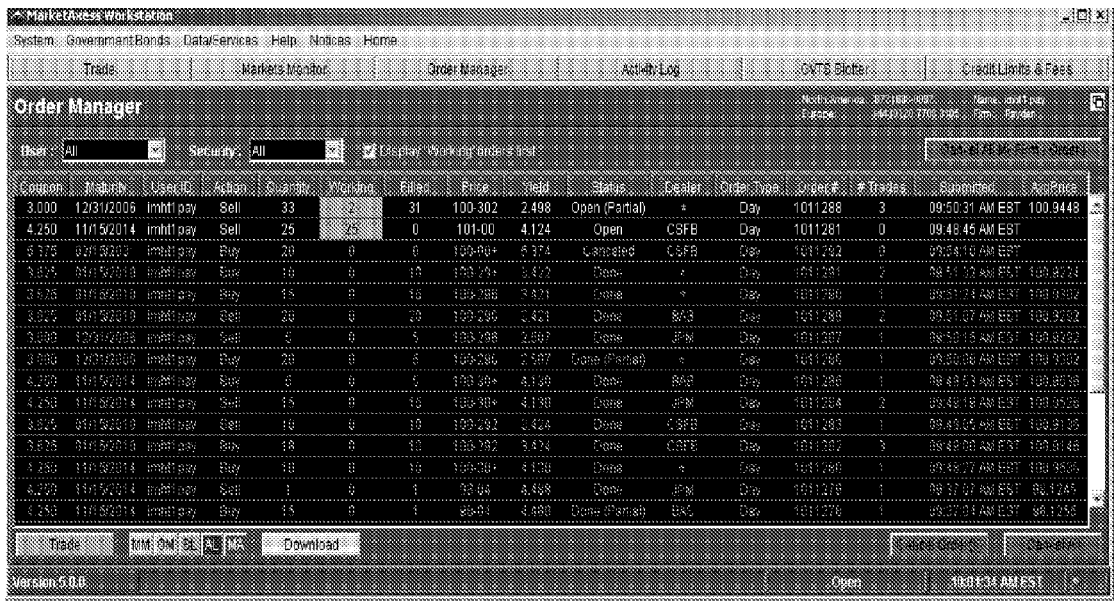
FIG. 9 is an example of a trade order manager in the user interface of an embodiment of the invention.
Figure 10:
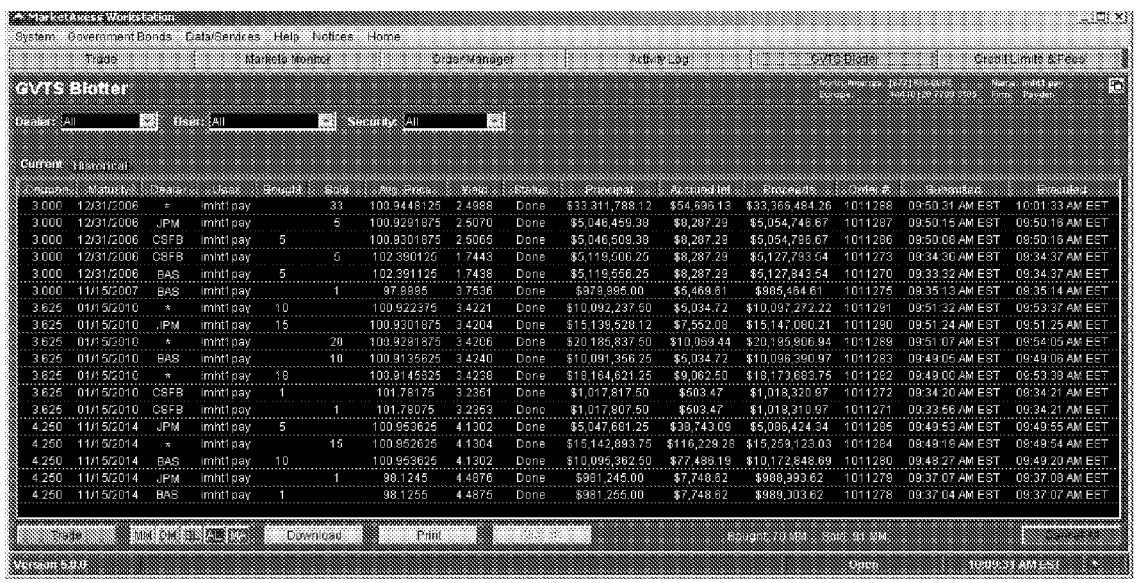
FIG. 10 is an example of a trade blotter in the user interface of an embodiment of the invention.

The Exclusive Phase Matching process shown in step 410 can begin with a tie-breaking step 415, with detail of the tie-breaking process illustrated in FIG. 8. The tie-breaking process provides a short interval of time, such as 300 milliseconds, during which any dealer matching messages received in response to the CBO are considered to have arrived at the system at the "same time" as any other dealer matching message arriving within the tie-breaking interval. Tie-breaking process 415 can also provide for the option of operating trading system 310 with a price auction capability. A purpose of the tie-breaking mode 415 is to encourage the maximum participation of the dealers involved and to provide the client with the greatest breadth of liquidity over long term use of the system. The tie-breaking interval time may be short enough so that any overall delay in execution time is minimal. However, it offers dealers 320 who might otherwise be at an infrastructure disadvantage the ability to compete fairly to provide liquidity to clients 330. For example, a dealer 320 located at great geographic distance from trading system 310 communication hub or hubs can compete for client flow even if that dealer were disadvantaged by an additional communication latency of say 5 milliseconds. As long as the system receives that dealer's matching message within the tie-breaking period the matching message is considered for the client. Tie-breaking process 415 works to preserve maximum choices of dealer liquidity for the client, thereby increasing competition and providing more opportunity for trade execution. The price auction option allows for price improvement through dealers 320 competing to fill the CBO. This option may further enhance client 330 opportunity for execution with speed and a better price.

Tie-breaking process 415 begins at step 810 of FIG. 8. When the pre-established time interval expires at step 820, the number of dealer responses or dealer matching messages are counted at decision 830. If there are no matches then tie-breaking process 415 returns with no match at step 840. If there is exactly one (1) match, the process returns with that dealer matching message in step 880. If there are multiple responses (i.e. greater than 1), then decision 850 tests whether price auction capabilities are enabled. If the result is a "NO", then one of the tied responses is randomly chosen in step 860 using standard approaches for computerized random or pseudo-random number generation. The selected winning dealer match is returned in step 880. If decision 850 returns a "YES" showing the price auction mode is enabled, then the dealer responses are examined in step 870 and filtered for best price (most favorable for the client). Decision 880 tests the selection(s) made in step 870. If there are tied responses after filtering for best price, then the process proceeds with tie-breaking step 860; otherwise, if there is one best response, then that dealer match is returned in step 880.

Returning to FIG. 4, after some time in exclusive phase matching step 410, trading system 310 checks if the CBO has been matched, canceled, or the timer expired at step 420. If none of the above options have occurred in step 420, the process returns a "NO" and trading system 310 goes back to Exclusive Phase Matching step 410. If at least one of the above options has occurred in step 420, returns a "YES" and trading system 310 moves to step 430. At step 430, a decision is made regarding whether the order was matched, cancelled, or open. An open order can be an order that remains unexecuted or unfilled. If the order was cancelled, then at step 430 trading system 310 can proceed to close the order at step 425.

If a suitable matching counter-order or counter-orders from the Exclusive Dealers is found for the CBO within the Exclusive Time, then the order is matched and filled. The matched and filled order then flows on to step 432 where processing forks into two parallel paths of Post-trade processing in 435 for any matched trade amounts, and Order complete checker of step 445 which determines if the CBO is completely filled. If the determination at step 445 is a "Yes," then the process is terminated for this CBO at step 450; if the determination step at 445 is a "NO," then processing continues with Open Phase Matching at step 440.

If the CBO doesn't match or is only partially matched in the Exclusive phase as described above, then the system proceeds or transitions to Open Phase Matching 440. In Open Phase Matching 440, the CBO is sent to Dealers 320 who Client 330 has specifically selected as a second set of Permissioned Dealers, which may again include the Exclusive Dealers, for matching the order.

Open Phase initiates at step 440, with the selected Open Phase Dealers having a limited period of time within which to transmit into the system a matching counter-order (the "Open Time"). This time period is preferably configurable by the Client within a system-defined range, in the same manner and with a similar value to the Exclusive Time. The matching process can be fully automated, with Dealers 320 utilizing the trading system APIs 313 for this purpose, and the Open Time would typically be about 3 seconds. Flow iterates through steps 440 and 455 unless Client 330 has selected no Dealers or until the CBO receives a match, is cancelled, or the Open Time expires causing decision 455 to result in a "Yes." Step 465 then tests the outcome of Open Matching. If the order was cancelled before step 465, then the order is closed at step 460.

Otherwise at step 465, if a suitable matching counter-order or counter-orders from the Open Phase Dealers is found for the CBO within the Open Time then the order is matched and filled. The matched and filled order then flows on to step 467 where processing forks into the two parallel paths of Post-trade processing in step 470 for any matched trade amounts, and step 480 where it is determined if the CBO is completely filled. If the outcome of step 480 is a "Yes" then the flow is terminated for this CBO at step 485; if the outcome of step 480 is a "NO" then processing continues with Protected Phase Matching at step 475.

If the CBO is still open and at least partially unmatched after proceeding through Exclusive and Open states, then trading system 310 progresses the CBO to the Protected Order state, shown at step 475. In Protected Order "PO" state the order is placed solely with the Exclusive Dealers, who have an opportunity to match all or part of the order during the time the CBO stays in PO phase 475. PO phase 475 persists and may iterate with step 490 until the order is canceled by the client, is timed-out on the basis of the client's original Good-for-time instructions, is filled, or is partially filled. Protected phase is the last phase and its completion will complete the order which may end up filled through one or more executions, partially filled across one or more executions, remain unfilled, cancelled by client instruction, or timed out under good-for-time instructions. Depending on client 330 instructions, a filled order or partially filled order across one or more executions may be considered a match and trading system 310 moves to step 495. In step 495, post-trade processing is completed. This step, like steps 470 and 435, can consist of clearing, settling, and/or accounting the order which may take place electronically, partially electronically, or by another mechanism. After post-trade processing the order is filled or completed at step 485 or alternatively if there is no match for the order the order is closed at step 498.

Figure 5:
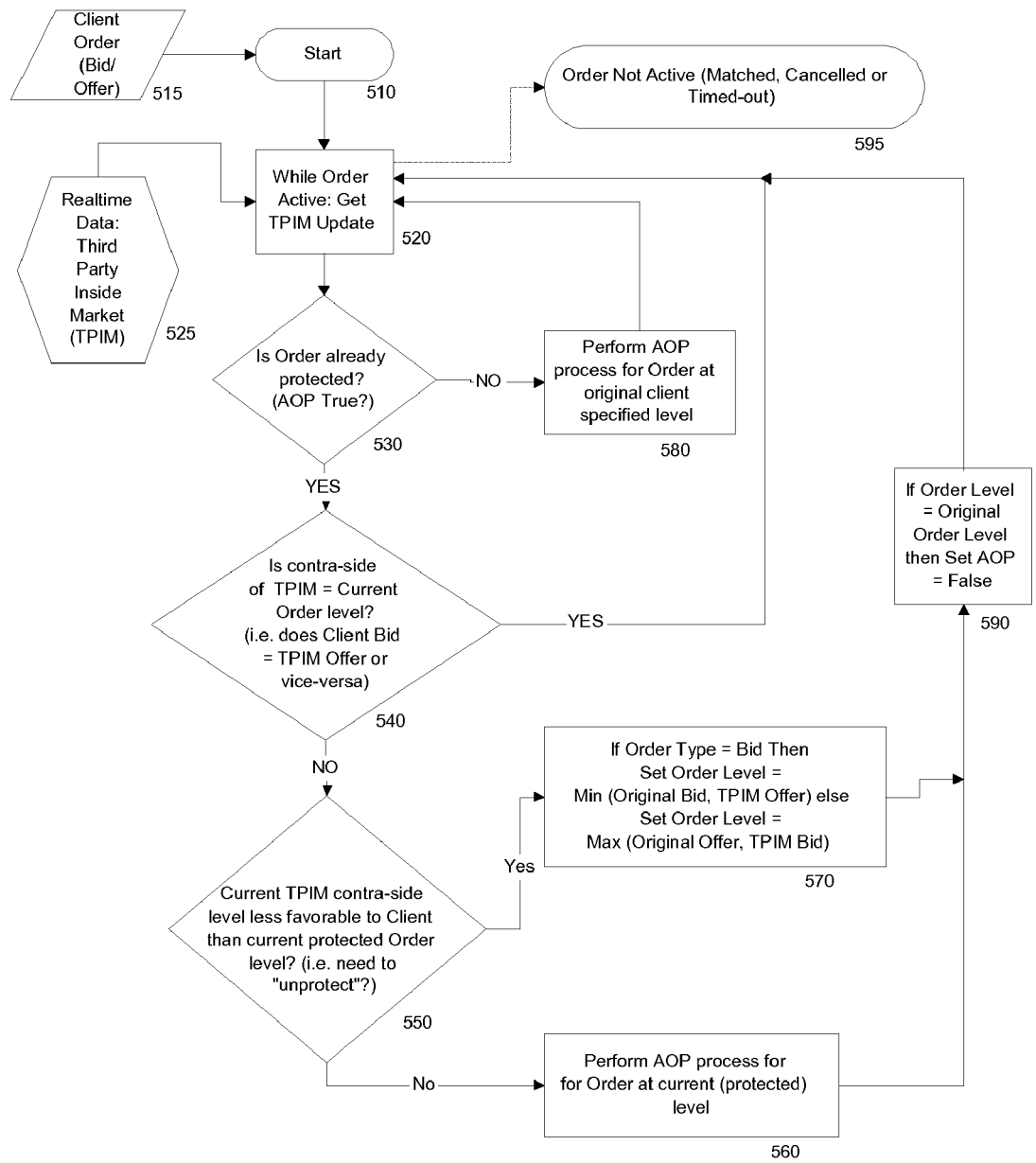
FIG. 5 is a flowchart showing a protected order phase according to an embodiment of the invention.
Figure 6:
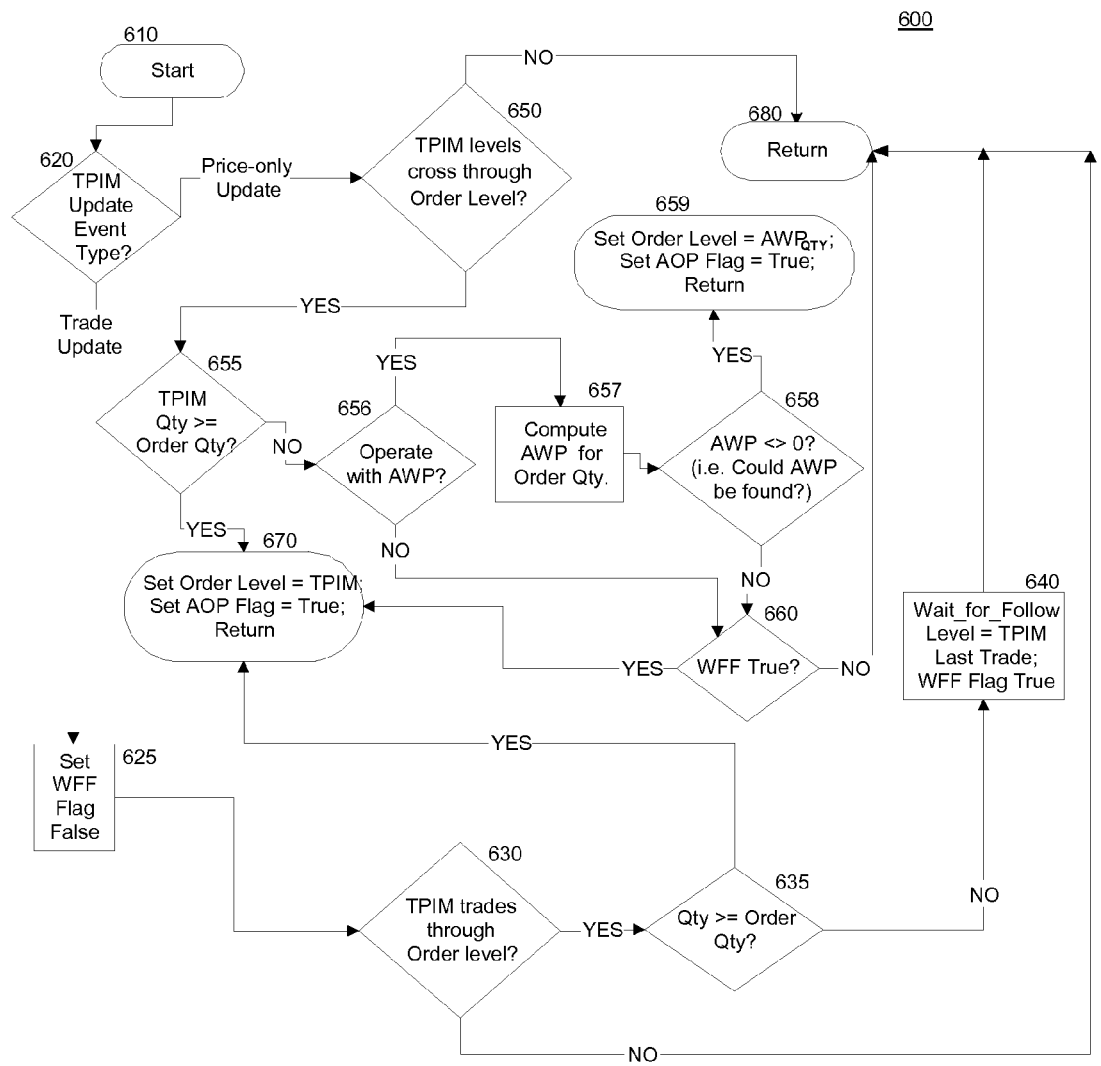
FIG. 6 is a flowchart showing further details of an automated order protection process according to an embodiment of the invention.

Protected Order phase 475 is further explained in conjunction with FIG. 5 that shows the flow of system processing for Protected Order phase 475, and FIG. 6 that details the Automated Order Protection process. These processes are controlled and implemented by Automated Order Protection Processor 311. The processes in FIGS. 5 and 6 are used to actively manage the Client Bid/Offer relative to the best levels in a Third Party Inside Market. The Third Party Inside Market can be obtained from Interdealer Broker Data, for example, or from Third Party Data 350. In some embodiments, Third Party Inside Market can be a combination of Third Party Data 350 with current and previous executions and Client Bid/Offers on trading system 310. Protected Order phase 475 protects the client from off-market execution and creates an opportunity for actual price improvement.

Figure 4A:
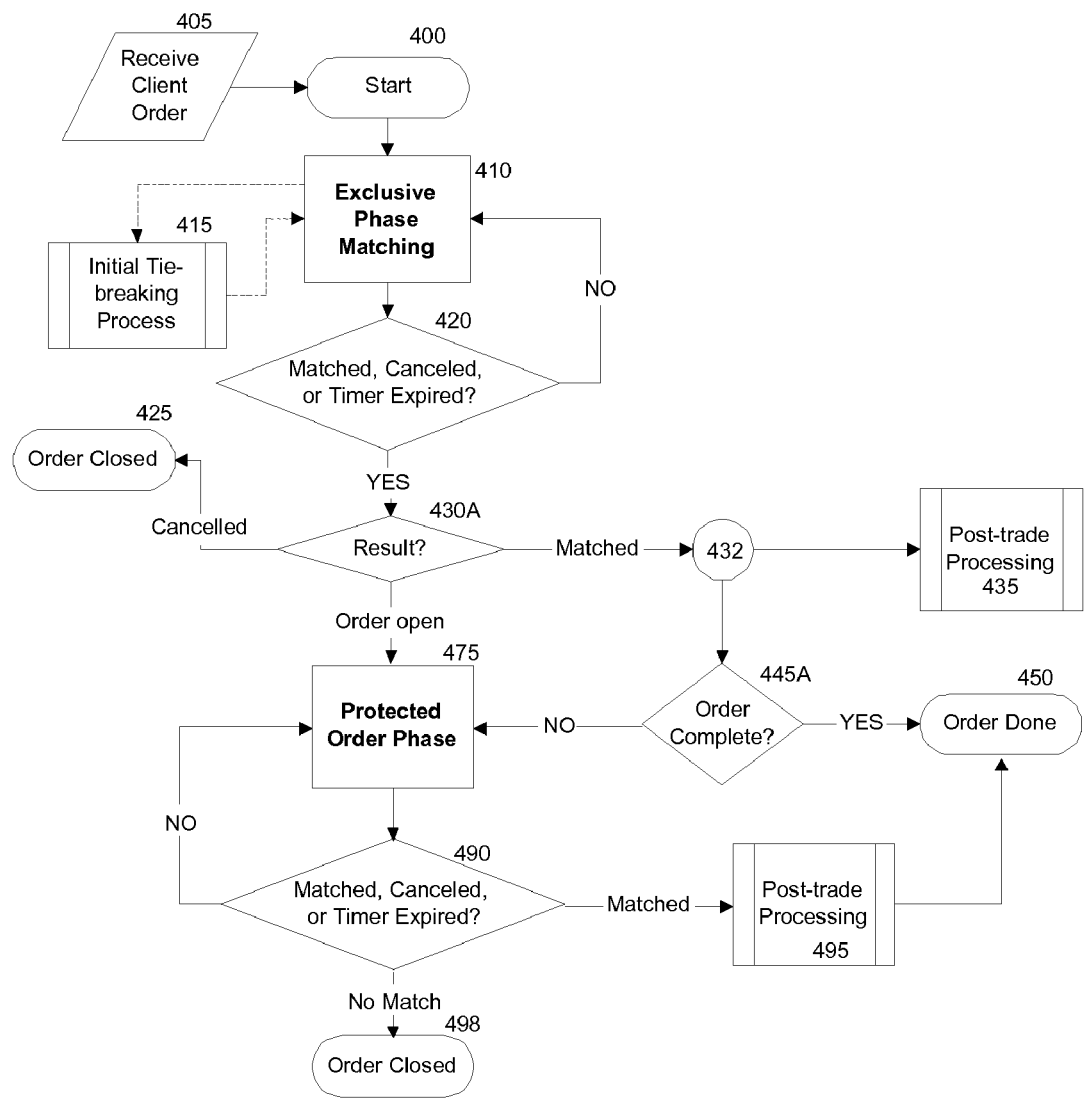
FIG. 4A is a flowchart showing an order matching method involving two phases according to an embodiment of the invention.

FIG. 4A is an illustration of a flowchart of a two-phase embodiment for order matching performed in a Exclusive Phase Matching and a Protected Order Phase. Compared to FIG. 4, the order matching illustrated in FIG. 4A does not include an Open Phase matching. In the embodiment of FIG. 4A, if decision 420, which checks if the client order in Exclusive Phase Matching 410 has been matched, canceled, or an Exclusive Time has expired, returns a "YES" the client order moves to decision 430A. If 430A returns "Order Open", then processing proceeds to Protected Order Phase 475. If decision 430A returns "Matched" then the order flows to step 432 where the order forks for parallel processing in steps 435 and 445A. If decision 445A, when checking if the order is complete, returns a "NO" then the balance of the order flows to Protected Order Phase 475. As shown in FIG. 4A, exclusive phase matching 410 can transition to protected order phase 475 in some embodiments. In other embodiments, Open Phase Matching 440 may precede the transition to Protected Order Phase 475. Further, Protected Order Phase 475 may be the only phase in some embodiments, with a client order entering directly into Protected Order Phase 475. Protected Order Phase 475, in various embodiments, may use the Exclusive Dealers of Exclusive Phase Matching 410 for client order execution.

FIG. 5 illustrates the logic managing the Protected Order process in accordance with certain embodiments of the present invention. As shown, at step 510 a process is initiated whereby CBO data 515, which can also be considered an order in some embodiments, prompts step 520 to update or refresh Third Party Inside Market ("TPIM") real-time data 525. Step 520 can continually, at different time periods, or upon a predetermined event check CBO 515 against the price levels in TPIM 525. TPIM data 525, represents the market on the same asset as specified in the CBO, with the best bid (most expensive) and best offer (least expensive) available. In some embodiments, TPIM data 525 may also include bids and offers below the best, which are optionally used by the system at a latter stage. The TPIM data can also include price levels of bids and offers.

Trading system 310, with each iteration, establishes in test 530 whether the CBO has already been protected. That is, the system checks whether the CBO price level is presently modified by trading system 310 according to Automated Order Protection ("AOP") rules. The AOP rules can include instructions to modify an order or a CBO to a more favorable price, to execute an order or a CBO within a certain period of time, to fill a CBO with multiple dealer's 320 bid/offers, and to partially fill an order or a CBO if an order is not filled during a predetermined time period. If the CBO is not already protected (AOP Flag is False) then test 530 returns a "NO" and processing flows to step 580 where the CBO is processed with AOP rules. The AOP processing of step 580 is further explained below in conjunction with FIG. 6. After AOP processing 580 trading system 310 returns to step 520 where TPIM data is updated from TPIM 525 and the CBO or order status is checked. If the CBO should become no longer active due to completion, cancellation, or time-out, then this flow terminates at step 595.

If test 530 returns a "YES," the CBO is already protected, and the process flows to decision 540 to test whether Client's 330 order level equals the contra-side of the TPIM. That is, if Client's 330 bid equals the TPIM Offer level, or if Client's 330 offer equals the TPIM Bid level. If test 540 returns a "YES," then the process flows back to step 520 as no further protection action is required at these TPIM levels.

If test 540 returns a "NO" then the CBO flows to test 550. At step 550, trading system 310 determines whether the market has moved to levels that are more or less favorable to the client given that the CBO level is not the same as the TPIM contra-side level since the CBO level was last modified by AOP rules 580. If the TPIM contra-side levels (i.e., TPIM bid for $CBO_{OFFER}$, or TPIM offer for $CBO_{BID}$) are now less favorable to Client 330 then trading system 310 flows to step 570. At step 570, the CBO is "unprotected" either back to the original CBO level or to the current TPIM level, whichever results in more favorable level for the Client. In certain embodiments, this is accomplished by rules shown in step 570: For $CBO_{BID}$ the new level equals the minimum of the original CBO and the current TPIM Offer, else; for $CBO_{OFFER}$ the new level equals the maximum of the original CBO offer and the current TPIM bid. Trading system 310 then moves to step 590 where the AOP Flag is set according to whether or not the current CBO level equals the original CBO level.

If the result of test 550 is a "NO" then the CBO does not need to be unprotected, but instead may undergo further evaluation at step 560. In step 560, the CBO is processed according to the AOP rules, which can be seen in FIG. 6. The CBO then flows to step 590 where the AOP Flag is set according to whether the current CBO level equals the original CBO level. After step 590, processing flows to step 520 where the iteration continues while the CBO is active.

FIG. 6 illustrates details of processing flow 600 of AOP processor 311 in accordance with certain embodiments of the present invention. After starting the process at step 610, step 620 tests whether a pertinent TPIM update is a price-only update, or whether a trade has occurred on the market-side of interest (i.e., on the bid side if CBO is a bid, or on the offer side if CBO is an offer).

If step 620 is a price-only update, then the TPIM levels are tested in step 650 to determine whether the TPIM levels represent a "passive inversion" relative to the current CBO level. This would be the case if the TPIM Offer is cheaper than the CBO bid, or if the TPIM bid is more expensive than the CBO offer. Either of these situations gives a first appearance of an order that crosses the market and requires further examination to determine whether order protection is appropriate. If there is no passive inversion then step 650 simply returns "NO" and flow moves to step 680 where control is returned to step 560 or 580. In certain embodiments, the control can be returned to a module in trading system 310 that invoked this portion of the AOP process.

Alternatively, if test 650 returns a "YES," then a quantity test 655 determines whether the TPIM quantity on the contra-side of the CBO causing the inversion is greater than or equal to the CBO quantity, where the contra-side is the offer side for $CBO_{BID}$, or the bid side for $CBO_{OFFER}$.

If the quantity test at step 655 returns a "YES," then the inversion is of sufficient quantity to invoke protection and flow moves to step 670 where the CBO level is adjusted to the same level as the TPIM contra-side level. Additionally, the AOP Flag is set to "True" and control is returned to the calling module of trading system 310, step 560, and/or step 580.

If the test at step 655 returns a "NO," then decision 656 determines whether the preference is to operate the AOP process with or without using Average Weighted Price ("AWP") statistics from Third Party Data 350 or TPIM. In some embodiments, AWP computations are only possible if Third Party Data 350 provides data showing bids and offers that are positioned behind the best bid and best offer in the order stack. Alternatively, trading system 310 may have an internal stack where bid/offers from dealers 320 are stored for a given security. The internal stack can be implemented through hardware or software and is used to calculate order fulfillment from multiple dealers 320 bid/offers. For example, consider the order stack below for a given security:

| Stack | Price | | Size | | | | Average Weighted Price | |
|---|---|---|---|---|---|---|---|---|
| | | | | | Cumulative | Cumulative | | |
| Position | Bid | Offer | Bid | Offer | Bid | Offer | AWP Bid | AWP Offer |
| 1 | 98.75 | 99.00 | 100 | 100 | 100.00 | 100.00 | 98.75 | 99.00 |
| 2 | 98.65 | 99.10 | 150 | 90 | 250.00 | 190.00 | 98.69 | 99.05 |
| 3 | 98.50 | 99.15 | 85 | 75 | 335.00 | 265.00 | 98.64 | 99.08 |
| 4 | 98.25 | 99.75 | 200 | 175 | 535.00 | 440.00 | 98.50 | 99.34 |
| 5 | 98.00 | 99.90 | 120 | 100 | 655.00 | 540.00 | 98.40 | 99.45 |

The best bid and offer, 98.75 and 99.00 respectively, are at the top of the stack for size of 100 by 100. "Worse" bids (lower in price) and worse offers (higher in price) are shown in the lower rows, or stack positions 2 through 5. The sizes (for example, units of $million for the U.S. Treasury market) are shown for each bid and offer at each level of the stack, or five levels deep in this case. In this example, the average price required to buy 265 from the offers on the stack would be 99.08. This is the AWP for the best offers 99.00, 99.10, and 99.15 for quantities of 100, 90, and 75 respectively, computed as (99.00×100+99.10×90+99.15×75)/(100+90+75), or 26255.25/265=99.08.

More generally stated, $$R = CBO_{QTY} - \sum_{i=1}^{N-1} Q_i, \text{ and } AWP = \left(\left(\sum_{i=1}^{N-1} P_i * Q_i\right) + P_N * R\right) / CBO_{QTY}$$

where N=the stack position of the maximum visible cumulative bid/offer quantity on the order stack that is less than or equal to the Client order quantity $CBO_{QTY}$; P=the price of the order at stack position i on the order stack; Q=the quantity visible on the order stack for order i; and the computed value R is the residual quantity of the Client order that will be applied to the Nth price.

If cumulative quantity exists within the order that is greater than or equal to the quantity of the CBO and the system preference option is to operate with AWP then decision 656 returns a "YES," and trading system 310 proceeds to step 657. At step 657 the AWP is computed for the quantity specified in the CBO. The AWP is computed from the average weighted price using the CBO quantity in its entirety according to the prices and quantities displayed on the contra-side of the market. For example, if the CBO is a bid of 99.11 for 250 then to fill the entire quantity of 250 requires buying from all of what is offered in position 1 and 2, and part of the 3$^{rd}$ position offer in the stack above.

As highlighted above in the stack, the cumulative AWP ranges from 99.05 in position 2 to 99.08 in position 3. In this example, the AWP for a quantity of 250 is 99.07 because only a portion of the 3$^{rd}$ position was used.

| Client Bid | | AWP | |
|---|---|---|---|
| Price | Qty | @Qty | Protect? |
| 99.11 | 250 | 99.07 | Yes |

The AWP may not always be found for the Clients' specified quantity. For example, if the CBO was a bid for size of 2000, and 2000 exceeds the total size available on the offered side of the market (it totals 1535 in the previous example order stack) then it is not possible to compute the AWP for the CBO, and step 657 returns zero. If an AWP can be found, then decision 658 results in a "YES" and trading system 310 flows to step 659. At step 659, the CBO is protected at a level equal to the computed AWP, the AOP Flag is set to "True," and control is returned to the calling module of trading system 310, step 560, and/or step 580.

Otherwise, if step 658 returns a "NO," or if previous decision 656 returned a "NO" (that is, the CBO was not operating with AWP enabled), the CBO flows to step 660. Step 660 tests whether the Wait-for-Follow Flag is True. If step 660 returns a "YES," then the system proceeds to step 670 where the CBO level is protected to the level of contra-side of the TPIM. Additionally in step 670, the AOP Flag is set to "True," and control is returned to the calling module of trading system 310, step 560, and/or step 580. Otherwise, if the Wait-for-Follow ("WFF") check at step 660 returns a "NO," the flow moves to step 680 where control is returned to the calling module of trading system 310, step 560, and/or step 580.

An alternative flow through step 620 results if there has been a trading event in the TPIM. If there was a trading update CBO moves to step 625 and the WFF Flag is cleared (i.e., set to "False"). Step 630 checks whether the TIPM has reported a trade event at a level through the CBO level that is an "active inversion." If step 630 results in a "NO" then there may be no need to protect the order, and process flow terminates at step 680. Upon termination at step 680, control can return to calling module of trading system 310, step 560, and/or step 580. Alternatively, if test 630 results in a "YES," then the active inversion is reacted to, and the CBO flows to step 635 that tests whether the quantity traded is the same or more than the CBO quantity. If step 635 results in a "YES," then the active inversion is of sufficient quantity and may require protection of the order, which is accomplished by flowing to step 670. If the test at step 635 results in "NO," then the WFF Flag is set to "True" and the CBO flows to decision 640. At decision 640 the Wait-for-Follow level is set equal to the TPIM of the last trade and the WWF is kept at true. The process terminates at step 680 and control returned to the calling module of trading system 310, step 560, and/or step 580.

The WFF Flag represents a Wait-for-Follow state where Wait-for-Follow processing can occur. If the CBO is in the Wait-for-Follow state, then a passive inversion of any quantity following an active inversion, even quantities less than the CBO quantity, can invoke protection. For example, if a resting order in the market provokes an inversion for a quantity less than the CBO quantity, but this condition follows a trading event inversion, then it is assigned more "weight" by trading system 310. In some embodiments, the assigning of more weight can lead to an overriding of the size comparison that takes place at, for example, step 635, and the CBO is protected.

Wait-for-Follow processing captures price change events in the TPIM or Third Party Data 350 that might otherwise be filtered out by quantity checks. This may occur in thin market conditions or where there are orders resting in the TPIM and the full order size is not visible for some or all orders in the third party order stack. The determination of whether price levels have changed enough after a trade (i.e., the trade was not a one off or spurious event) to warrant protection can be supported by waiting to see where the market comes to rest after the trade. In certain embodiments, the amount of price change permitted before entering into a protected state can be set by client 330. In other embodiments, if following a trade on the bid side, a new market offer rests at that last trade price or lower, or conversely on the offer side a new market bid rests at that last trade price or higher, then the new resting levels are significant enough to enable protection of the CBO.

An example of Wait-for-Follow processing is shown in the table below with a sequence of market events from sequence #1 to sequence #4. Sequence #1 shows a CBO, a Client bid with a price of 99.12 for a quantity of 100. The TPIM shows securities offered at 99.25 for a size of 65. The Client bid at 99.12 is below 99.25 and the AOP state is OFF as shown in the column at the right. In sequence #3 the market within the TPIM trades down to 99.08, where the "*" signifies that a trade is occurring. Although the price level 99.08 is less than the Client bid level of 99.12, the AOP state remains OFF because the quantity traded is 15, and is less than the Client bid quantity of 100. The AOP processor does detect however an active (i.e., traded) inversion, signified by the AOP state "OFF,A" below. In this state a WFF Flag would be set to TRUE at decision 640 in FIG. 6. In sequence #4 the new offer side of the TPIM comes in at 99.08, satisfying the condition of being less than or equal to the last traded level and also less than the Client bid price (i.e., "crosses through the order level" as tested in decision 650 of FIG. 6). The Client bid is subject to AOP, modified and set lower to 99.08 even though the TPIM offer size of 50 is less than the Client bid quantity of 100. The Client bid is set lower because the TPIM offer level has crossed through the Client bid, causing a passive inversion immediately following the active inversion in sequence #3.

| Time | Client Bid | | Third Party Inside Market (TPIM) | | | | TPIM | | AOP |
|---|---|---|---|---|---|---|---|---|---|
| | | | Price | | Size | | Trades | | |
| Seq # | Price | Qty | Bid | Offer | Bid | Offer | Level | Qty | State |
| 1 | 99.12 | 100 | 98.75 | 99.25 | 50 | 65 | | | OFF |
| 2 | 99.12 | 100 | 99.12 | 99.25 | 50 | 65 | | | OFF |
| 3 | 99.12 | 100 | 99.08* | 99.12 | 35 | 50 | 99.08 | 15 | OFF, A |
| 4 | 99.12 | 100 | 99.02 | 99.08 | 75 | 50 | | | ON, P |

Another feature of the Automatic Order Protection process for Clients 330 and Dealers 320 is referred to as "Autofill." Autofill can make it easier for dealers 320 to fill a CBO of clients 330 by providing a window in which a dealer response to a client CBO is filled. This may be useful in circumstances where Third Party Data 350 showing a Third Party Market is moving rapidly, prices are changing in a volatile manner, and Dealer 320 systems communicating with trading system 310 lose synchronization with respect to the latest updated Client Bid/Offer. Such a condition can arise, for example, from a race condition where at time t trading system 310 generated a new auto-protected level, and a Dealer 320 system was transmitting a message to match the CBO level at a time t-i. At time t the message from Dealer 320 reaches trading system 310, but it is too late as the new auto-protected level was already enabled. Since the CBO level has changed, the Dealer match attempt fails, which can cause further iteration of the matching process.

In certain embodiments, an "Autofill" option is provided in order to mitigate the negative impact of such race conditions on Client order fulfillment. The Autofill function can also make execution easier for Dealers 320 to execute quickly in those circumstances where it is their preference to sell securities on the offered-side of the TPIM or buying securities on the bid-side of the TPIM when the TPIM has slight movements during the intervening dealer matching message transmission time. These slight movements in the TPIM can consequently change the auto-protected CBO level if the CBO is undergoing AOP processing at the moment the system checks the price terms of the Dealer message with the price terms of the CBO.

The Autofill option can be selected on a message-by-message basis within the Dealer matching response to the Client Bid/Offer. If Autofill is enabled, the Dealer message may also specify an "Autofill Threshold" that specifies the tolerable limits of difference between the price specified by the Dealer and the current real-time TPIM level. If the threshold is $\frac{1}{32}^{nd}$ of point for example, and the Dealer is willing to sell $1 million U.S. Treasury 2 Year Notes at price of 99-28 (i.e., 99 and $^{28}/_{32}$nds points), but the TPIM offer side is now 99-27.5, the order can still be filled because the difference of these two prices is only $\frac{1}{2}$ of $\frac{1}{32}^{nd}$. The match is able to Autofill since the pricing discrepancy is within the specified threshold.

In certain embodiments the Autofill option can be selected on a CBO-by-CBO basis by client 330. If client 330 selects Autofill and the CBO has been modified by AOP processor 311, the CBO may be filled by a dealer matching message with a less favorable price. This may occur if the price in the dealer matching message was within the client's 330 specified threshold and the price less than the client's 330 originally specified CBO price.

Figure 7:
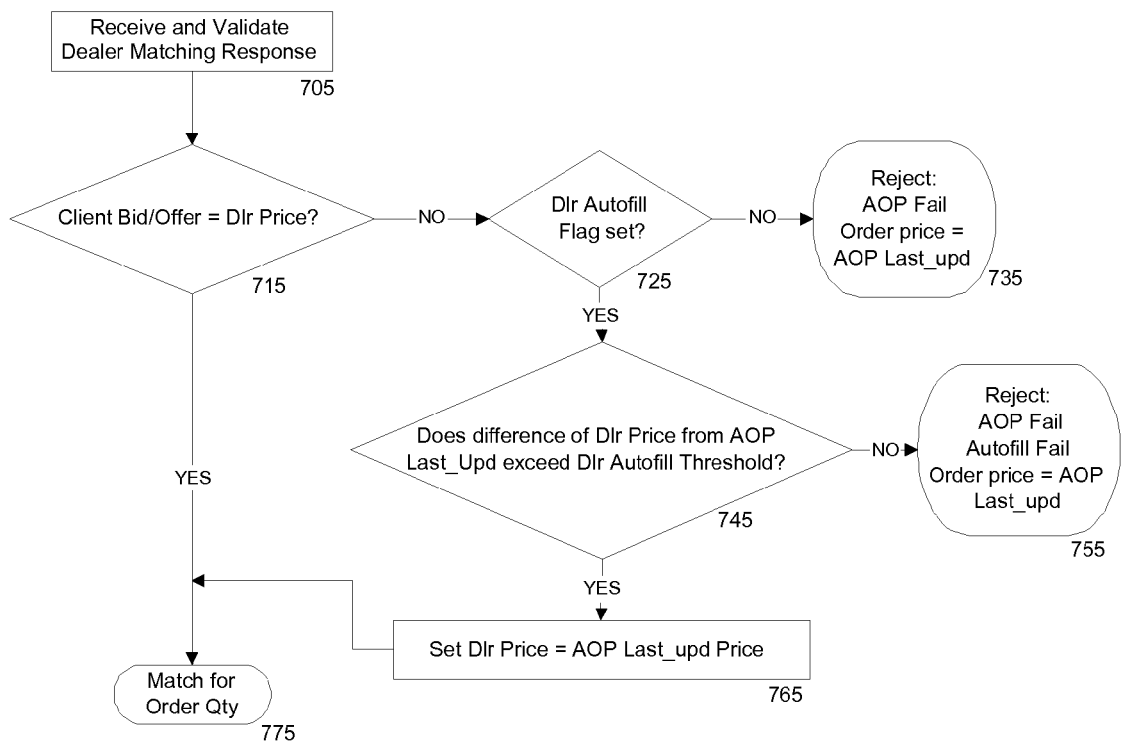
FIG. 7 is a flowchart illustrating an autofill method according to an embodiment of the invention.

FIG. 7 illustrates an example of Autofill processing in accordance with certain embodiments of the present invention. Autofill processing can be used during match checking steps 420, 455, or 490 of FIG. 4. As shown in FIG. 7, the Autofill process begins at step 705 with the receipt of a Dealer matching message sent in response to a Client Bid/Offer by trading system 310. The receipt and subsequent validation processing can be implemented by Dealer Trading Application Programming Interface ("Dealer Trading API") 313 and Automated Order Protection Processor 311. At step 715 the CBO and Dealer response are tested to check whether there are matching price terms. If test 715 results in a "YES" then processing proceeds to step 775 where an order quantity match occurs. If however, test 715 results in a "NO" then processing checks the Dealer matching message may be in response to a "stale" CBO price at step 725. Step 725 tests whether the Dealer has enabled the matching message for Autofill treatment. If test 725 results in a "NO" then the Dealer match is rejected and this matching attempt terminates at step 735 with an AOP failure status returned to the Dealer. If step 725 results in a "YES" then step 745 determines whether the difference between the Dealer price and the latest, potentially protected, CBO price exceeds either the Dealer specified Autofill threshold or, if unspecified then a default threshold. If the CBO is a bid then the test at step 745 is whether the Dealer Sell price–$CBO_{BID}$ >= $Threshold_{AUTOFILL}$. Alternatively if the CBO is an offer, then the test is whether $CBO_{OFFER}$–Dealer Buy price >= $Threshold_{AUTOFILL}$. If testing at step 745 results in a "NO," then the difference exceeds the threshold and the matching attempt terminates at step 755 with an AOP/Autofill failure status returned to Dealer 320. If test 745 returns a "YES," then the difference is within the threshold the Dealer price is automatically set to the same level as the CBO level in step 765 and the matching process proceeds to match for order quantity at step 775.

Example Cases

Note that all prices used in these examples adhere to US Treasury market price conventions that use 32nds rather than decimal fractions where the price consists of a whole number "handle" such as 99 and a fractional figure that represents $1/32$nds of 1. However, alternative price conventions can also be used in connection with the present invention. The third place of the fraction expression represents $1/8$ths of $1/32$nds and can be any digit from 1 to 7 except that the digit 4, for $4/8$ or $1/2$ of 32nds is usually written as a "+". So for example 99-26+ is interpreted as 99 and 26.5/32, or 99-267 is 99 and (26+7/8ths)/32.

Client order gets filled at 99-266 by dealer at client's specified level unaffected by AOP since client level is within the TPIM.

| TPIM Bid | Client Order | TPIM Offer | TPIM Size |
|---|---|---|---|
| 99-26+ | Buy 20 @ 99-266 | 99-27 | 25 × 25 |

Client order gets filled at an improved level of 99-26+ after TPIM Offer moves to 99-26+ as shown in the second row, and AOP moves client's order to match the new TPIM Offer side:

| TPIM Bid | Client Order | TPIM Offer | TPIM Size |
|---|---|---|---|
| 99-26+ | Buy 20 @ 99-266 | 99-27 | 25 × 25 |
| 99-262 | Buy 20 @ 99-26+ | 99-26+ | 25 × 25 |

Client order gets filled at original specified level of 99-266 after TPIM fluctuates. In the example below, in the second row the TPIM Offer moves to 99-26+ and AOP protects Client's Buy order by adjusting it to be within TPIM. However, the Client's order is not filled at this level and in the third row the TPIM Offer swings back to 99-27. Trading system 310 then reverts the order to 99-266 in the third row, or unprotects, as TPIM Offer moves away and becomes more expensive. In the fourth row, the Client Order is filled at 99-266:

| TPIM Bid | Client Order | TPIM Offer | TPIM Size |
|---|---|---|---|
| 99-26+ | Buy 20 @ 99-266 | 99-27 | 25 × 25 |
| 99-262 | Buy 20 @ 99-26+ | 99-26+ | 25 × 25 |
| 99-26+ | Buy 20 @ 99-266 | 99-27 | 25 × 25 |
| 99-26+ | Buy 20 @ 99-266 | 99-266 | 25 × 25 |

Incremental Trade Workup Functionality

In accordance with alternative embodiments of the present invention, an incremental trade workup functionality is provided where the original counterparties to the trade that triggers the workup have the feature of exclusive ability to trade between each other multiple numbers of times prior to the expiration of workup period at which time the workup orders of all the users participating in the workup are matched.

The invention includes the following optional technical and process features, although alternative processes and/or system may be utilized to perform the functionality of the present invention:

A rule that if the full or partial "Submitted Live Size" of a Primary Counterparty to the workup trade was executed during the workup period while the user's workup dialog was closed, the user's workup dialog is re-displayed on that user's workstation A walkthrough feedback from the development, questions and answers and business teams.

No requirement that the flashing of the "YOU BOUGHT/SOLD" size value on the workup dialogs of the primary counterparties is configurable with the overnight change in configuration parameters.

Users do not incrementally increase the size or their workup orders. The "Proposed Size" value should become the "Live Size" upon the user clicking "Buy On/Sell On" or "I'd buy/I'd Sell" buttons.

The value in the "Proposed Size" text box remains as the user entered value and should not be reset back to the default increment value for that product every time user clicks "Buy On/Sell On" button on the workup alert.

Activity log messages for workup order modification are created.

Description of a possible race condition: If the user is trying to modify his workup order by submitting a new "Proposed Size" while his workup order is being executed (i.e. possible race condition), the modification is rejected.

In accordance with some embodiments of the invention, the workup orders of the users that joined the workup are matched at the end of the workup period with workup orders of the parties to the original trade maintaining their original time priority on the respective sides of the market.

The goal is to allow the owners of the top price/time priority orders on the respective sides of the market, execution of which triggered the workup, trade between each other multiple number of times prior to the expiration of the workup period at which time the workup orders of all the users participating in the workup are matched. The following definitions are provided below.

Primary Counterparties to the Workup Trade—Counterparties to the original trade that triggered the workup who are the owners of the top price/time priority orders on the respective sides of the market (their orders were on the top of the market depth on the respective sides of the market prior to workup invocation)

Secondary Counterparties to the Workup Trade—Counterparties to the original trade that triggered the workup who are the owners of the orders that were not at the top of the market depth on their sides of the market when the workup was triggered.

Figure 11:
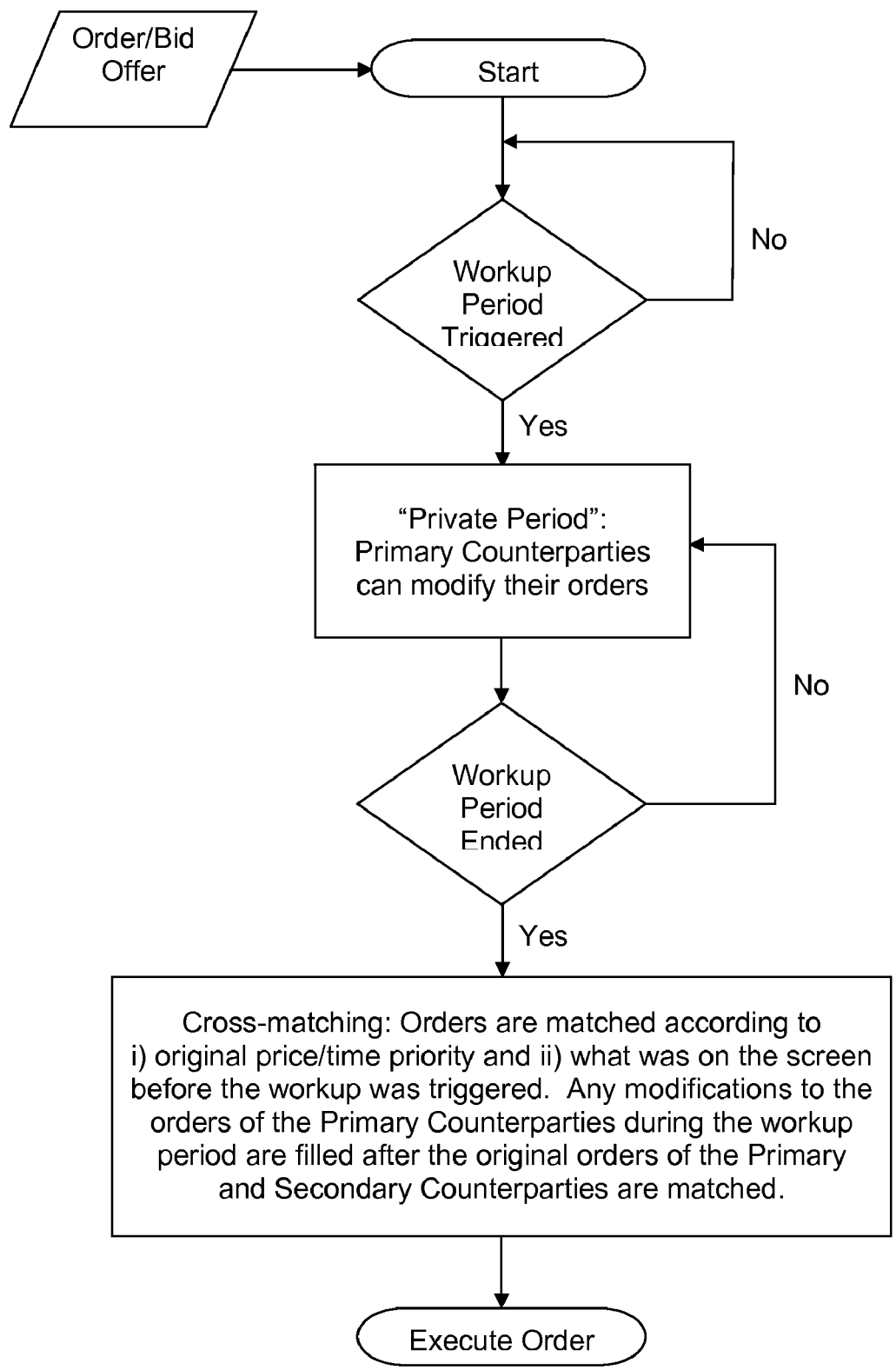
FIG. 11 is a flowchart showing the workup period functionality according to an embodiment of the invention.

FIG. 11 shows a flow diagram of the incremental trade workup functionality in accordance with some embodiments of the invention. When the incremental trade workup functionality is triggered, a workup period between the primary counterparties commences, where the primary counterparties are allowed to modify their orders. The workup period is private between the primary counterparties. FIG. 11 shows that the primary counterparties are allowed to modify their orders more than once, during the workup period. When the workup period ends, orders are matched according to the original price/time priority and the amounts on the screen of each user before the workup was triggered. The modifications to the orders of the primary counterparties during the workup period are filled after the original orders of both the primary and secondary counterparties are matched.

Figure 12:
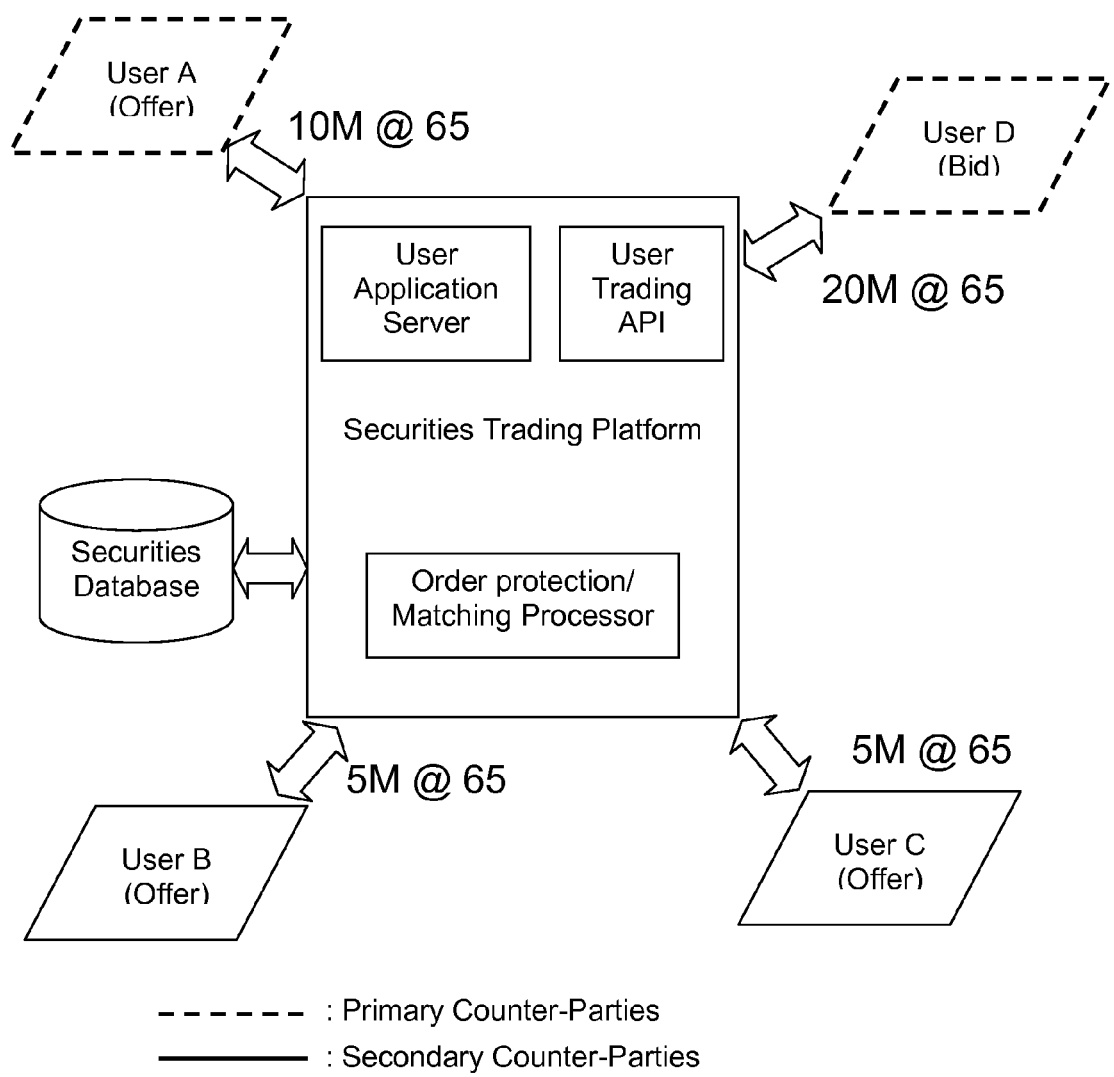
FIG. 12 is an example of the incremental trade workup functionality according to embodiments of the invention.

FIG. 12 shows an example of a trade with primary and secondary Counterparties. According to the example, the current market on an instrument is shown in the table below:

| User   | Size | Bid |
|--------|------|-----|
| User A | 10M  | 65  |
| User B | 5M   | 65  |
| User C | 5M   | 65  |

If user D submits an Offer at 65 for 20M, the incremental workup period will be triggered, since the full size at the given level on one side of the market is cleared out.

In this case user A and user D are considered to be the Primary Counterparties (shown with dashed lines) to the workup trade and users B and C are considered to be the secondary counterparties (shown with solid lines) to the workup trade.

Users A and D retain priority during the incremental workup period. They can both add size during the "private period." Once the work-up period has ended they retain top priority until their full size is executed.

Users B and C are part of the original execution and maintain that order of priority in executions after the work-up period has expired and the cross-matching is invoked. B's size is first exhausted followed by C's full size and then additional counterparties are matched.

What is on the screen is what is executed before the workup is triggered. Therefore user A gets 10M, B gets 5M, and C gets 5M. If user A adds more size during the work-up then it is filled during the work-up and after users B and C have already been executed.

If user A had 20M on screen and users B and C each had 5M then user A's full size is executed first. It does not mean that user A gets 10M, user B gets 5M and user C gets 5M.

In accordance with some embodiments of the invention, the system matches the workup orders of the Primary Counterparties' to the workup trade as soon as they are submitted to the system and prior to the expiration of the workup period.

The "YOU BOUGHT/SOLD" size value on the workup dialog of the Primary Counterparties to the workup trade is displayed, for example, in red font.

The "YOU BOUGHT/SOLD" size value on the workup dialogs of the Primary Counterparties to the workup trade is updated and flashes, for example, for 5 seconds every time an additional workup size is executed.

The "Live Size" value on the workup dialogs of the Primary Counterparties to the workup trade is decremented by the executed size every time there is an execution.

The "Proposed size" value becomes the "Live Size" value every time the user enters the value in the "Proposed Size" text box and clicks on the "Buy On/Sell On" or "I'd buy/I'd Sell" button prior to the expiration of the workup.

If the user enters "0" as the "Proposed Size" value, the user's workup order is cancelled (the same action is taken as when the users clicks "Withdraw Order" button).

The Primary Counterparties to the workup trade, Secondary counterparties to the workup trade and all the other users participating in the workup have the ability to withdraw the "Live Size" of their workup orders prior to the expiration of the workup period by clicking "Withdraw Order" button on their workup dialogs.

If the full or partial "Live Size" of a Primary Counterparty to the workup trade was executed during the workup period while the user's workup dialog was closed, the user's workup dialog is re-displayed on that user's workstation.

If the user is trying to modify his workup order by submitting a new "Proposed Size" while his workup order is being executed (i.e. possible race condition), the modification is rejected. An error message that the modification is rejected is not displayed to the user.

Upon the expiration of the workup period the system matches the residual size of the workup orders of the Primary Counterparties' to the workup trade, the workup orders of the Secondary Counterparties to the workup trade and the workup orders of all the other users that joined the workup (who are not the counterparties to the original trade) with maintaining the time priority of those orders (as per current functionality).

Workup Triggering Conditions

An addition to all of the existing workup triggering conditions, the workup is optionally and advantageously triggered on a one man locked market.

Figure 13:
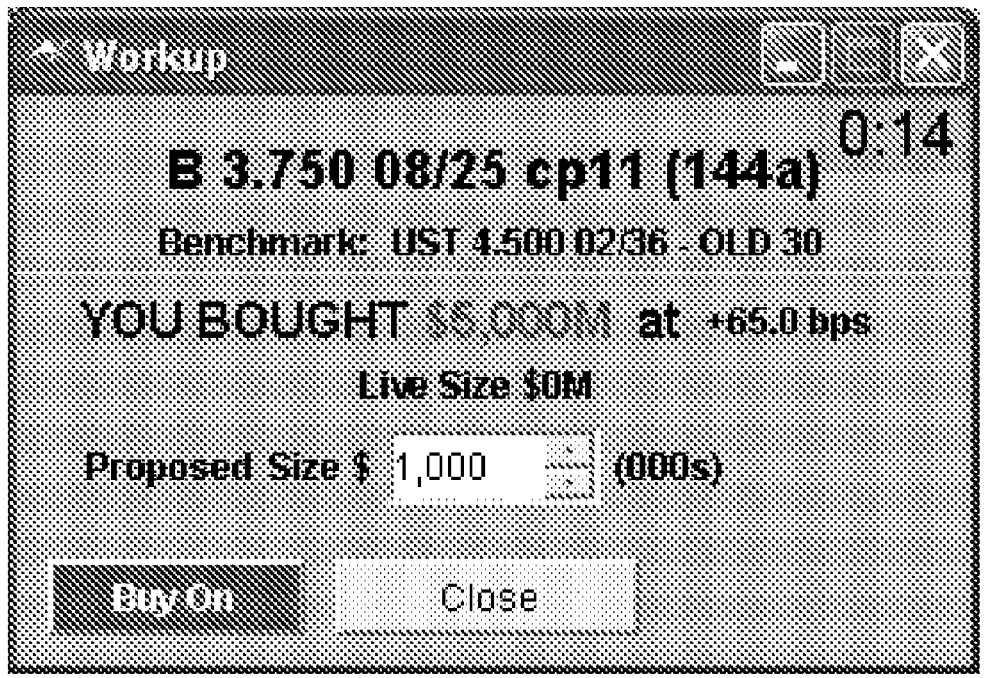
FIGS. 13-25 illustrate screenshots of various computer user interfaces according to incremental trade workup embodiments of the invention.

The workup dialog in accordance with one alternative embodiment for original counterparties is shown in FIG. 13. The "Live Size" value is displayed on the workup alert. The users have the ability to modify the size of their workup orders prior to the expiration of the workup period by selecting the size in the "Proposed Size" text box and clicking the "Buy On/Sell" on button. In the specific screenshot the user has the option to modify his "buy" order.

When the user clicks "Buy On/Sell" on button on the above alert the "Live Size" value is replaced by the size displayed in the "Proposed Size" textbox. The value in the "Proposed Size" text box remains as the user entered value and is not reset back to the default increment value for that product every time user clicks "Buy On/Sell On" button on the above alert.

For example, the default increment value for an instrument is $1,000M. The user modifies that value to $2,000M and clicks "Buy On/Sell On" button. The "Live Size" value becomes $2,000M and the "Additional Size" value remains $2,000M.

Figure 14:

The "Close" button is replaced with "Withdraw Order" button when the "Live Size" is greater than $0M, as shown in FIG. 14. The "Buy On/Sell On" button is never hidden to allow the user to overwrite the "Live Size" of the workup order multiple times.

Figure 15:

The "Withdraw Order" button is replaced with "Close" button when the "Live Size" equals to $0 MM, which would happen for example when the workup order is either withdrawn by the user or, in case of primary counterparties, the full size of the workup order has traded, as shown in FIG. 15

The "Live Size" value is displayed on the workup alert. The users have the ability to modify the size of their workup orders multiple times prior to the expiration of the workup period by selecting the size in the "Proposed Size" text box and clicking the "I'd Buy/I'd Sell" on button.

When the user clicks "I'd Buy/I'd Sell" on button on the above alert the "Live Size" value is replaced by the size displayed in the "Proposed Size" textbox.

The value in the "Proposed Size" text box remains as the user entered value and is not reset back to the default increment value for that product every time user clicks "I'd Buy/I'd Sell" button on the above alert.

Figure 16:

The users who are not the counterparties to the original trade that triggered the workup can join the workup on either bid or offer side. However these users can modify the size of their workup orders only on the same side (bid/offer) that they joined the workup. The action button (I'd Sell or I'd Buy) button for the opposite side is hidden and the "Close" button is replaced with "Withdraw Order" button once the user joins the workup (see the screenshot below). FIG. 16 shows the workup dialog for the users who are not the counterparties to the original trade that triggered the workup in accordance with an alternative embodiment of the invention.

In order for the users who are not the counterparties to the original trade that triggered the workup to join the workup on the opposite side their workup order has to be withdrawn. The "Withdraw Order" button is replaced with "Close" button and both "I'd Sell" and "I'd Buy" buttons are displayed on the workup dialog when the users who are not the counterparties to the original trade that triggered the workup withdraw their workup orders.

In accordance with alternative embodiments of the invention, a workup order modification generates activity log messages. The activity log messages may look, for example, like: <username>requests to Modify Workup Order: <username's><Bid/Offer><size><instrument short name>@<level>, <order options>, <order id>, during workup <username>Modified Workup Order: <username's><Bid/Offer><new size><instrument short name>@<level>, <order options>, <order id>, during workup Examples Ymtrader1 requests to Modify Workup Order: ymtrader1's Bid $5,000(5000) BAC 4.250 Oct. 1, 2010 @+66 bps, Day Order, SA, Order # 115716, during Workup Ymtrader1 Modified Workup Order: ymtrader1's Bid $7,000(7000) BAC 4.250 Oct. 1, 2010 @+66 bps, Day Order, SA, Order # 115716, during Workup In alternative embodiments, the invention provides an indicator on the workup bar for the primary counterparties to the workup trade that the total size or the part of the total size of the workup orders on the opposite side of the market belongs to the primary counterparty.

In alternative embodiments of the present invention, additional workup triggering condition may be implemented. For example, a rule may be added stating that when the full size of the one man locked market is executed in full on either side, the order(s) on the opposite side of one man locked market is automatically held The market is considered to be a one man locked market when the same user's bid and offer orders are at the same level and are on the top of the market.

In accordance with some embodiments, the following conditions are met for the workup to be triggered on a one man locked market:

1. The full size of either bid or offer order of the one man locked market must be executed in full.
2. There are no other users' live orders on either side of the market at the same level as one man locked market orders.

For example, when the condition one above is met and the full size of the one man locked market is executed in full on either side, the order(s) on the opposite side of one man locked market is automatically held.

If the same user that locks the market on top has multiple orders at the best level on the side of the market that did not execute, all of his/her orders are held (see the example 8 below).

Sample Scenarios:

1. The Market for an instrument is locked by the user A and looks as follows:

| User | Bid | BSize | Offer | OSize |
|------|-----|-------|-------|-------|
| A    | 100 | 5M    | 100   | 10M   |

Action: User B lifts user A's offer for full 10M.

Expected behavior: The workup is triggered, users A & B are considered original counterparties to the trade that triggered the workup. User A's Bid is held by the system.

2. The Market for an instrument is locked by the user A and looks as follows:

| User | Bid | BSize     | Offer | OSize |
|------|-----|-----------|-------|-------|
| A    | 100 | 5M        | 100   | 10M   |
| B    | 100 | 15M (AON) |       |       |

Action: User C lifts user A's offer for full 10M.

Expected behavior: The workup is not triggered since there are other live orders at the best level (user B's bid at 100 for 15M(AON)). User A's Bid is held by the system.

3. The Market for an instrument is locked by the user A and looks as follows:

| User | Bid | BSize | Offer | OSize |
|------|-----|-------|-------|-------|
| A    | 100 | 5M    | 100   | 10M   |

Action: User B enters an offer order via the order entry panel for 10M at 100.

Expected Behavior:

1. User B's offer order executes with user A's bid order at 100 for 5M.
2. The residual 5M at 100 of user B's order is submitted to the market and is live on the offer side.
3. The workup is not triggered since user B has a live order on the offer side of the market at the best level.
4. User A's Offer is held by the system.

4. The Market for an instrument is locked by the user A and looks as follows:

| User | Bid | BSize     | Offer | OSize |
|------|-----|-----------|-------|-------|
| A    | 100 | 5M        | 100   | 10M   |
| B    | 100 | 15M (AON) |       |       |

Action: User C hits both users A & B bids for a total of 20M

Expected behavior: The workup is triggered, User A's Offer is held by the system.

5. The Market for an instrument is locked by the user A and looks as follows:

| User | Bid | BSize | Offer | OSize |
|---|---|---|---|---|
| A | 100 | 5M | 100 | 10M |
| B | 100 | 15M (AON) | 100 | 15M (AON) |

Action: User C hits both users A & B bids for a total of 20M

Expected behavior: The workup is not triggered since user B still has a 15M(AON) offer at 100 (best level). User A's Offer is held by the system.

6. The Market for an instrument looks as follows:

| User | Bid | BSize |
|---|---|---|
| A | 100 | 5M |

Action: Broker submits a trade capture—User B bid 100 for 10M & User A offer 100 for 10M Expected Behavior: Workup is triggered and user A's bid is held by the system 7. The Market for an instrument looks as follows:

| Bid | BSize | | Offer | OSize | |
|---|---|---|---|---|---|
| User A | 100 | 5M (AON) | User B | 100 | 10M (AON) |
| User B | 100 | 10M (AON) | | | |

Action: User C hits both bids for a total of 15M

Expected Behavior: workup is not triggered

8. The Market for an instrument looks as follows:

| User | Bid | BSize | Offer | OSize |
|---|---|---|---|---|
| A | 100 | 5M | 100 | 10M |
| A | 100 | 15M (AON) | | |

Action: User B lifts user A's offer for full size of 10M

Expected Behavior: workup is triggered and both user A's bids is held by the system.

9. The Market for an instrument looks as follows:

| User | Bid | BSize | Offer | OSize |
|---|---|---|---|---|
| A | 100 | 5M | 100 | 10M |
| A | 100 | 15M (AON) | | |

Action: User B hits user A's bid 5M bid

Expected Behavior: workup is not triggered since user A has an additional 15M at the best level on the bid side of the market and user A's Offer of 10M is held by the system 10. The Market for an instrument is locked by the user A and looks as follows:

| User | Bid | BSize | Offer | OSize |
|---|---|---|---|---|
| A | 100 | 5M | 100 | 10M |

Action: User B enters a bid at 97 for 10M via the order entry panel

Expected behavior: User B receives bid thru the offer alert. If the user B clicks "Proceed" on the bid thru the offer alert, the trade will be executed at 100 for 10 m, the workup will be triggered and user A's Bid is held by the system.

11. The Market for an instrument is locked by the user A and looks as follows:
User Bid BSize Offer OSize
A 100 5M 100 10M Action: User B enters a bid at 97 for 15M via the order entry panel Expected behavior: User B receives bid thru the offer alert. If the user B clicks "Proceed" on the bid thru the offer alert, the trade will be executed at 100 for 10 m, the user B's 5M bid will be submitted to the market and the workup will not be triggered.

Figure 17:
Figure 18:

In alternative embodiments, an engaged index market is utilized and shown in FIG. 17. In the interest of space the 3 informational panels have been minimized. The bid on the Live Screen lifts the 101.50 Offer, as shown in FIG. 18.

The workup applies in some embodiments, for example, to the Original Buyer and Original Seller. Parties looking to join a trade will be queued in the same time priority as in our current methodology. The size entered into the work-up screens remains "hidden" from the market and cancelled if not executed.

The enhancement is targeted in some embodiments for the original counterparties who have trading priority over the rest of the market. The buyer and seller are enabled to execute multiple times within the work-up period before allowing other traders to get involved. This gives these counterparties the benefits of immediate execution and trade-building.

The Work-Up Dialogue Box is dynamic and updates the "Executed Size" and remaining "Live Size" Values in the Work-Up Session. Original Counterparty Buy and Sell Orders are matched and the Executed Size Increases and the Live Size Decreases. Matched trades are done, while live size can be withdrawn at any time. When the Work-Up period expires the residual "Live Size" will be matched against any orders from other interested counterparties.

Figure 19:
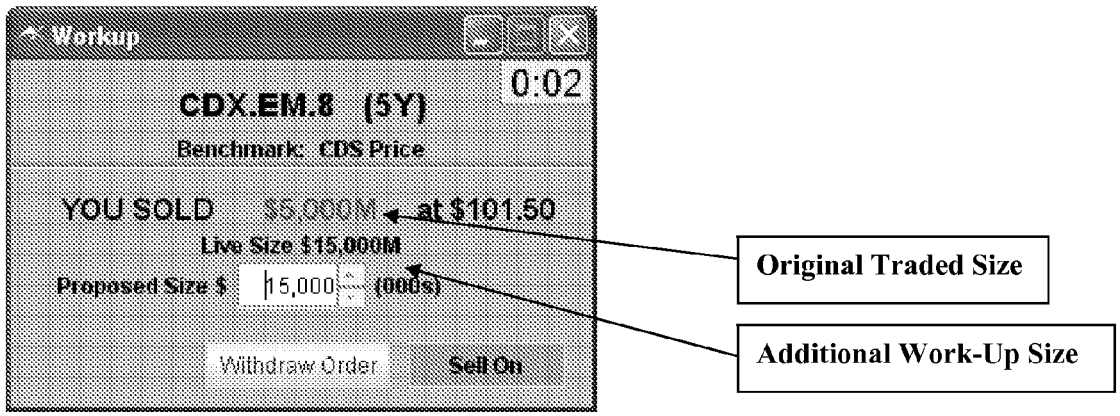

FIG. 19 shows an example where Trader 1 has Sold $5M on Screen and has put an Additional $15M into Work-Up looking to do a total size of $20M.

Figure 20:
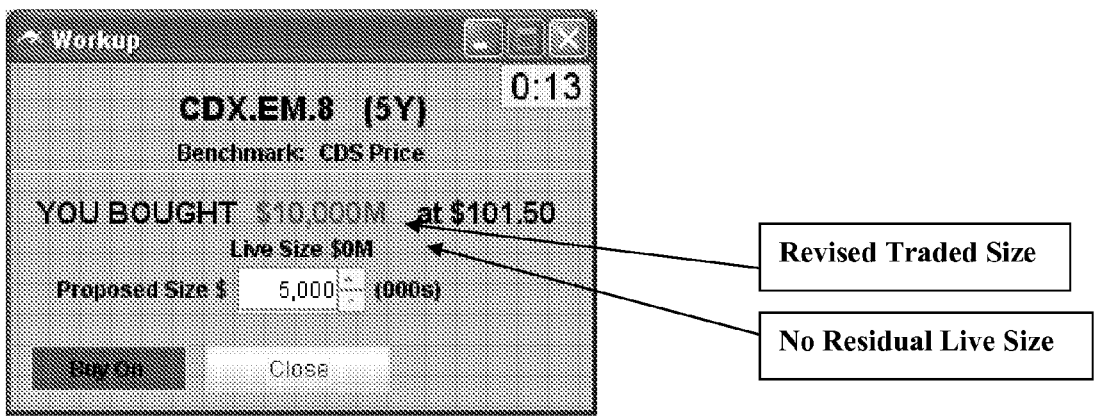

Trader 2 now enters $5M, shown in FIG. 20 into the Work-Up and is immediately matched against the size in the market. The screen now shows a Total of $10M done. As there was only $5M in Trader 2's order, there is NO Live Size as they were executed in full.

Figure 21:
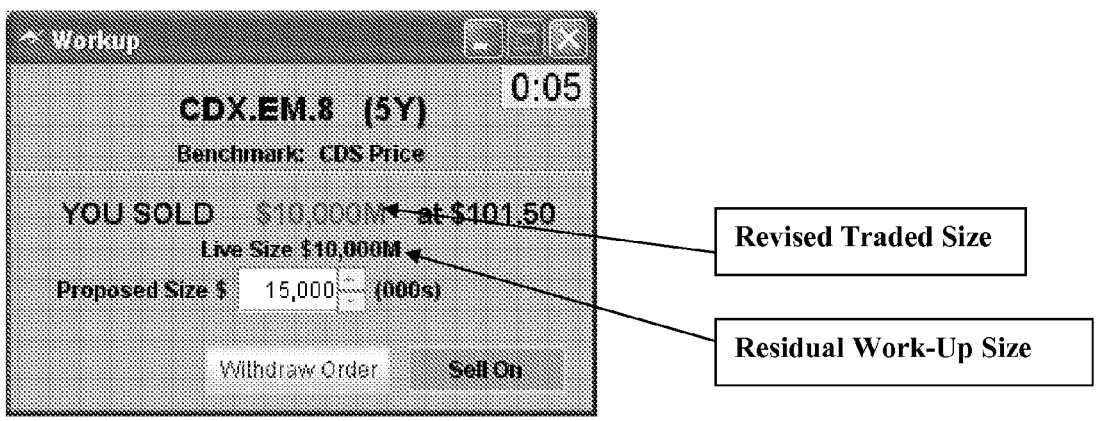

Trader 1 has now executed the same $10M, but still has the balance of their order "Live" in the market, as shown in FIG. 21.

Figure 22:
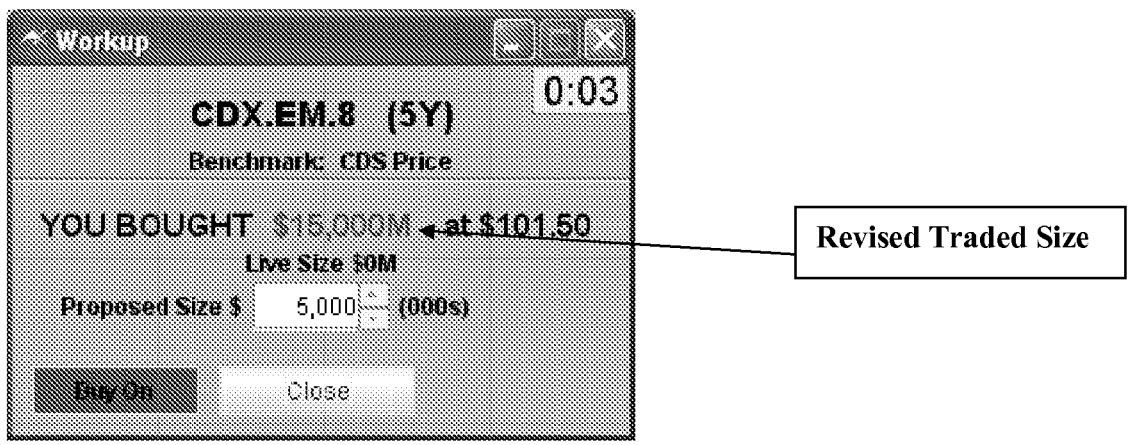

As we are still within the original "Private" Work-Up period between the original counterparties, Trader 2 can enter more size into work-up. In this scenario, they have entered an additional $5 MM which is immediately executed against Trader 1's Live Size. This brings the total executed size to $15 M incrementally built over 3 executions, as shown in FIG. 22.

Figure 23:
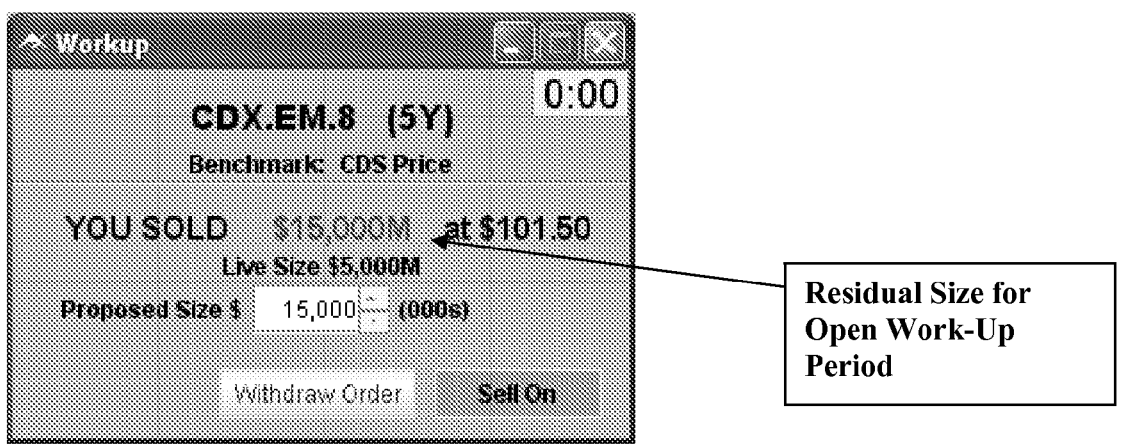

Trader 1 gets $15 MM of their proposed total size in the work-up period and now the residual portion of the Work-Up Size is Matched against any orders entered by Traders not involved in the original hit/lift, as shown in FIG. 23.

Figure 24:
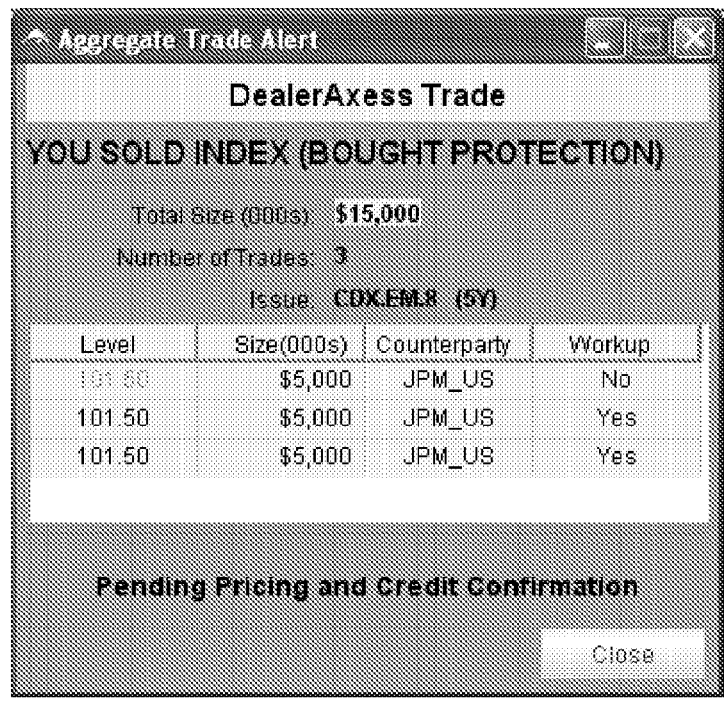

If no additional counterparties have entered orders then the residual size is cancelled and the Work-Up period concludes. FIG. 24 shows an aggregate trade alert window.

Figure 25:
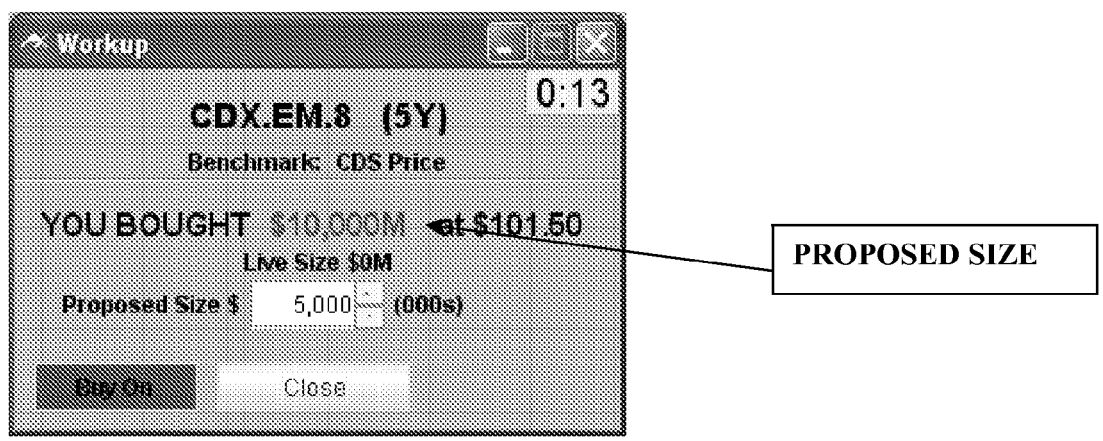

The Proposed Size field modifies the existing live size in the market. It does not incrementally add to what is already live. This gives the user the ability to increment/decrement the "Live Size." Therefore, if a user initially enters $5 MM as a proposed size, but wants to increase it to $10 MM, they simply put $10 MM in the Proposed Size Field and Click Buy On/Sell On. The Proposed Size field is shown in FIG. 25.

Market Data and Historical Info Displayed on the Live Market (LM) Screen

In alternative and optional embodiments, the present invention provides users with the ability to efficiently access Market Information and Historical Data for a particular instrument directly from the Live Market screen. The users are able to view instrument specific Market Depth, Orders and Trades, and Bond Ticker/Instrument details data in the Market View panel of the Live Market screen upon the selection of an instrument.

In some embodiments, the functionality displays/hides the "Market View" informational frame consisting of the following sub frames:
  Market Depth
  Orders and Trades Graph
  Instrument Details/Bond Ticker data
  Remove the Market Depth pop up from the system Users have the ability to hide and re-display the "Market View" frame, for example, by clicking the "triangle" icon on the left upper side of the "Market View" frame. In some embodiments, users are not able to hide/un-hide the sub-frames within the "Market View" frame. In some embodiments, users are not able to resize the sub-frames within the "Market View" panel.

The instrument specific data displayed within the various sub-frames of the "Market View" frames are advantageously dynamically updated as the user selects a specific instrument. In addition, in alternative embodiments, the invention provides the resizing of the "Market View" frame, the resizing, hiding/Un-hiding of the sub frames and/or entering, modifying, holding orders directly via Market Depth window.

GUI Live Market Screen

Figure 26:
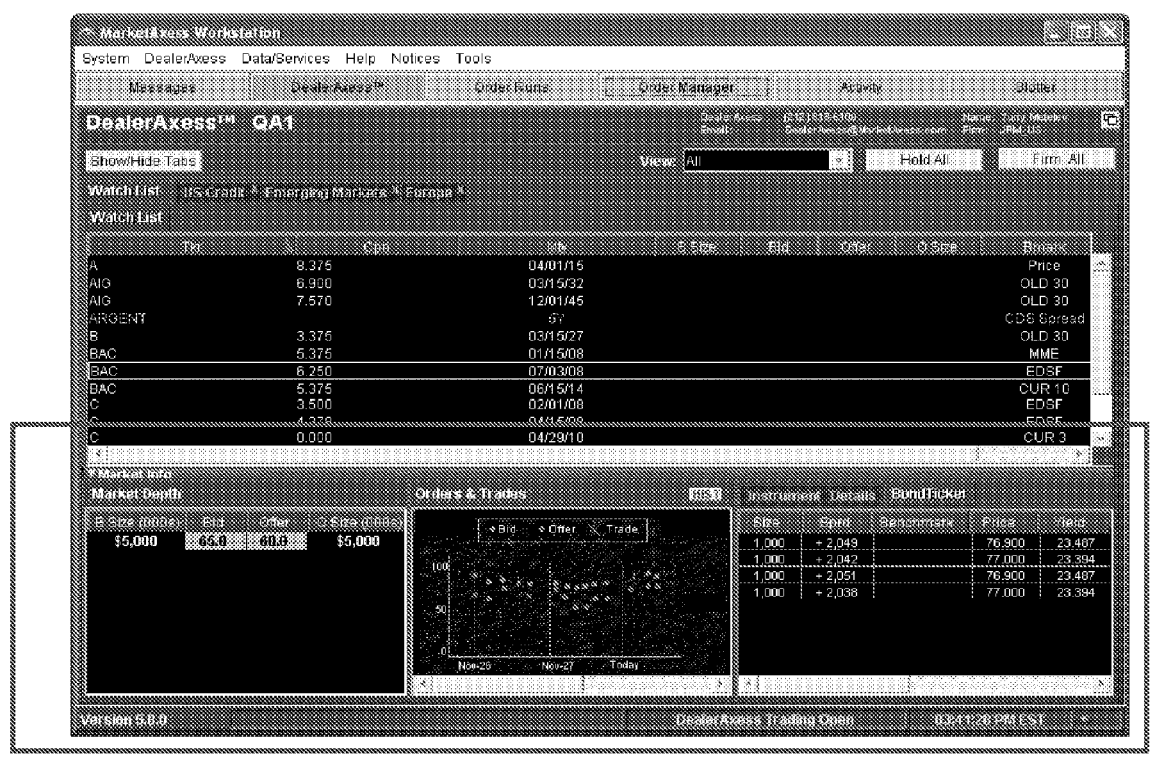
FIGS. 26-29 illustrate screenshots of various computer user interfaces that display market data and historical information directly on a live trade screen.

In some alternative embodiments, the "Market View" panel will be displayed in the bottom portion of the Live Market screen, as shown in FIG. 26.

Figure 27:
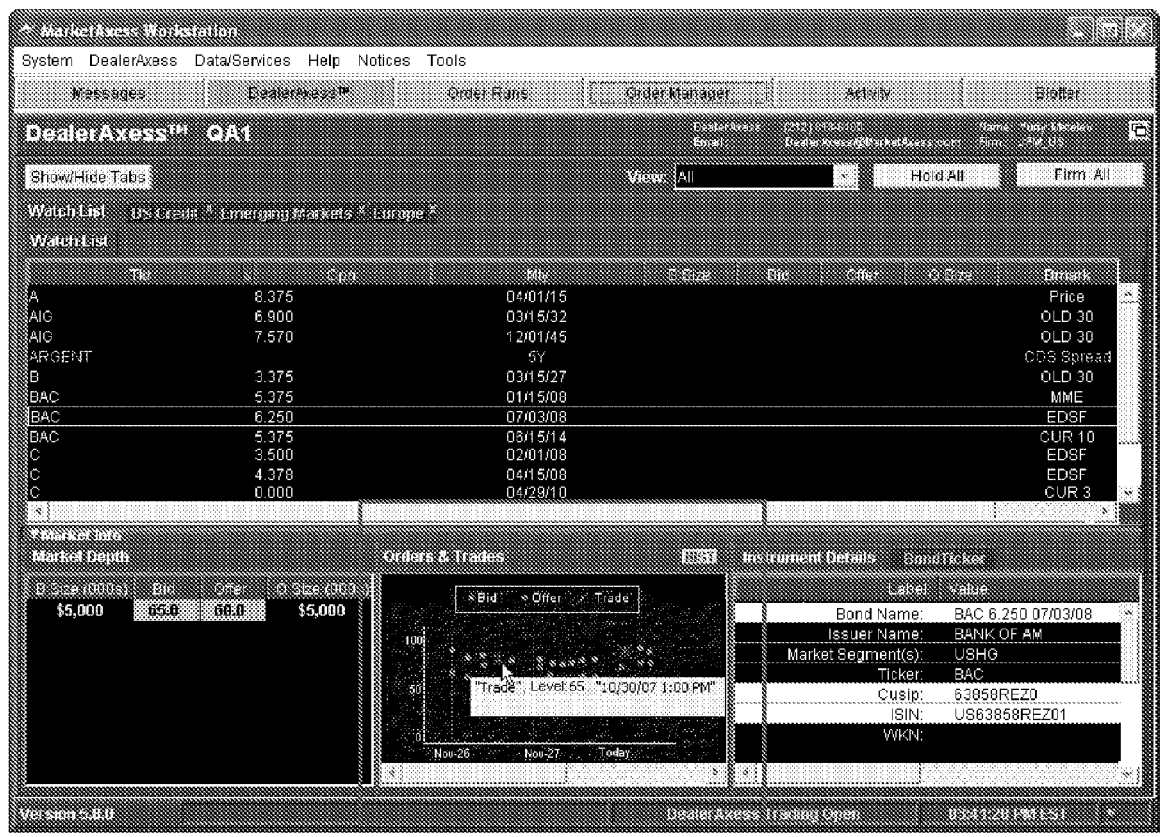

Initially, it will comprise the following 3 panels, described below:
  Market Depth
  Orders and Trades Graph
  Instrument Details/Bond Ticker data Market Depth Panel In some embodiments, the Market Depth Panel includes the information and has the same look and feel as the Market Depth pop-up. The market depth panel is the outmost left panel of the "Market View" frame. The market depth panel info is dynamically updated as the user scrolls thru the Live Market instruments. Orders and Trades Data Panel is shown in FIG. 27.

The orders and trades data are displayed in the form of graph with time displayed on the horizontal axis and bid/offer/trade levels displayed on the vertical axis. The users will be able to view Today's as well as Historical orders and trades data. The users will be able to switch between Today's and Historical views by clicking the "HIST" toggle button in the upper right hand corner of the "Orders & Trades" frame.

Today's View

In some embodiments, Today's view displays today's data. The horizontal axis of the Today's view is scaled in hours.

A new data point is created on the today's graph, for example, when there is a new best level on the corresponding side of the market for the instrument or any time a new trade is executed.

A Hit/Lift action is considered as an order entry action and, in some embodiments, if the hit/lift level is the best level on the corresponding side of the market, it is displayed as a data point on the today's graph.

When a new order is submitted and the level of that order becomes the best or predetermined threshold level on the corresponding side of the market, that level is optionally displayed as a data point on the today's graph.

When a user modifies a level and the modification results in the new best level or predetermined threshold level on that side of the market, the new level is displayed as a data point on the today's graph.

When a user holds an order and the hold action results in the new best level or predetermined threshold level on that side of the market, the new level is displayed as a data point on the today's graph. When a user firms an order and the firm action results in the new best level or predetermined threshold level on that side of the market, the new level is displayed as a data point on the today's graph.

When a trade is executed and the execution results in new best level(s) or predetermined threshold level on the corresponding side(s) of the market, the new best level or predetermined threshold level is displayed as a data point on the today's graph.

When a new data point is created (bid/offer/trade) if there is a live level on either bid or offer sides of the market, that level is re-displayed along with the new data point.

Bid level data points are displayed on the graph in green color. Offer data points is displayed on the graph in red color.

Trade data points is represented on the graph by, for example, the star. The color of the star is, for example, red if the bid was hit and green if the offer was lifted. Pointing the cursor over a Bid/Offer/Trade point on the graph should display the tooltip with the following information: "Offer/Bid/Trade/, Level:<value>, Timestamp".

Historical View

The Historical view will display some range of historical data including today's data. The horizontal axis of the Historical view is scaled in days.

The range of historical data displayed on the graph is configurable with the overnight change in configuration parameters. The initial configuration parameter is set, for example, to 30 days.

The following data points is displayed, for example, for each day on the historical view:
  Best Bid
  Best Offer
  Last Trade For today's date on the historical view the Best Bid, Best Offer and Last trade values are updated dynamically.

Bid level data points is displayed on the graph, for example, in green color.

Offer data points is displayed on the graph, for example, in red color.

Trade data points is represented on the graph by the star. The color of the star, for example, is red if the bid was hit and green if the offer was lifted.

Pointing the cursor over a Bid/Offer/Trade point on the graph displays the tooltip with the following information: "Offer/Bid/Trade/, Level:<value>, Timestamp".

Instrument Details/Bond Ticker Panel

Figure 28:
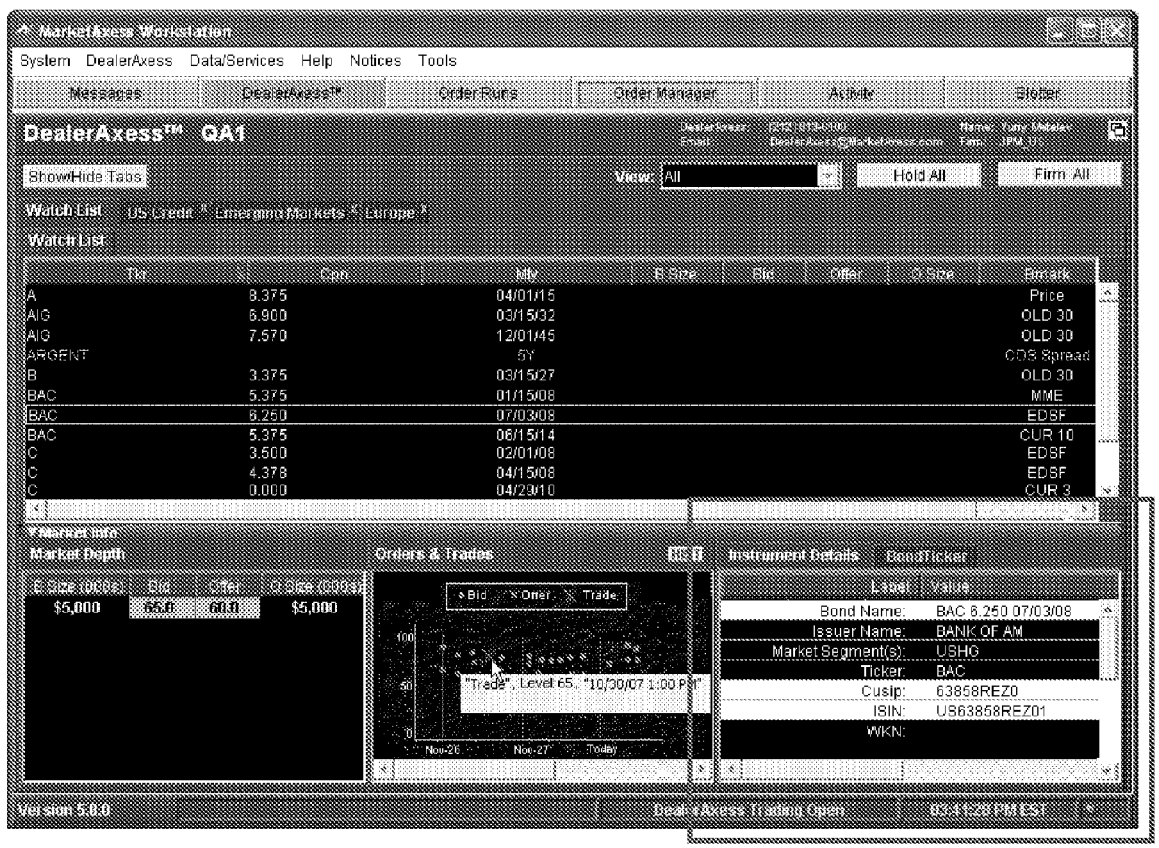

Instrument Details panel is shown in FIG. 28. The "Instrument Details/Bond Ticker" panel includes, for example, 2 tabs:

Instrument Details
Bond Ticker

In some embodiments, the Instrument Details tab is displayed and selected by default when the user scrolls through the LM regardless of which instrument is selected. It will contain the same information as "Instrument Details" pop up.

Figure 29:
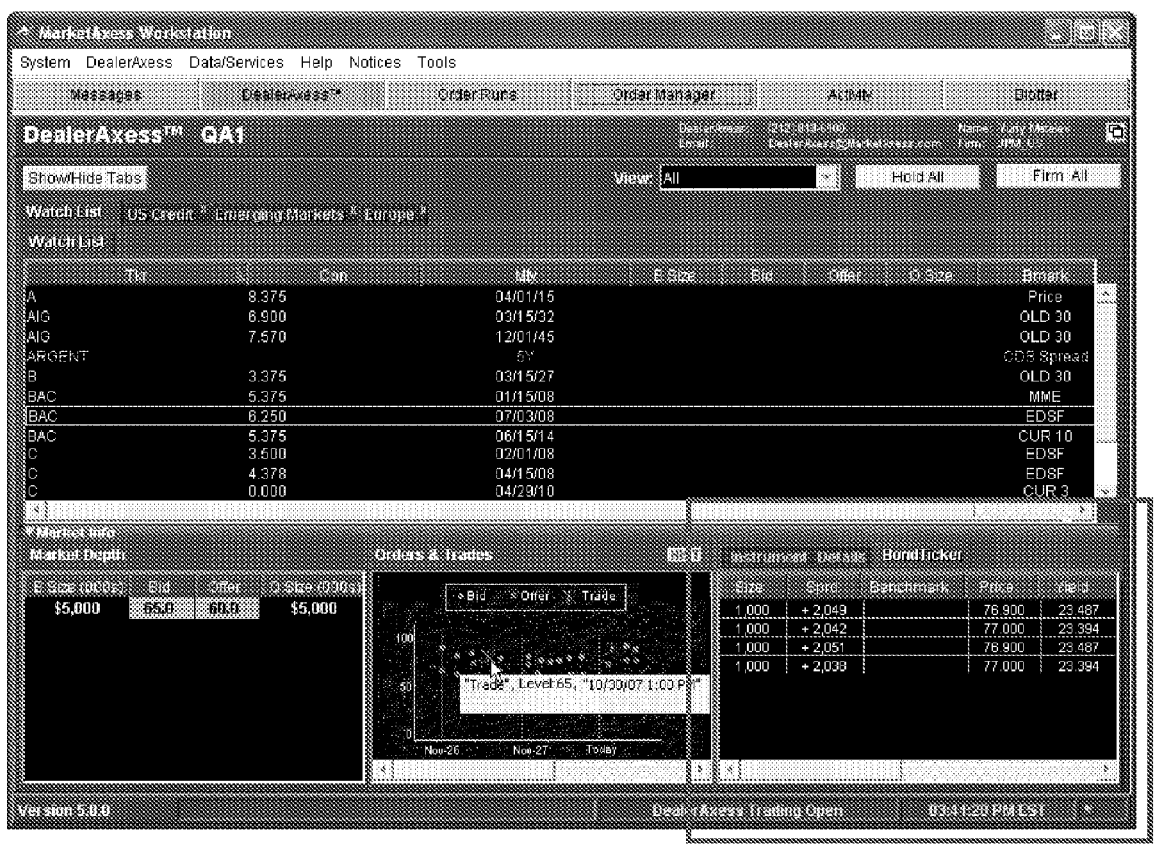

The Bond Ticker panel is shown in FIG. 29. The Bond Ticker tab is displayed for all of the instruments except CDS Indices, CDS Single Names and CDS Switches. The Bond ticker tab includes, for example, the same fields as current bond ticker pop up in RFQ system.

In some embodiments, the Bond Ticker tab data will be populated with the Bond Ticker's Trace data for High Grade and High Yield Instruments (same as RFQ system). For EM Instruments the Bond Ticker tab data will be populated with the Bond Ticker's MarketAxess data (e.g., same as RFQ system).

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

The invention claimed is:

1. A computer-based dealer-to-dealer trading method for trading a plurality of different types of bond instruments among a plurality of traders via a computer trading platform, the method comprising:

receiving, by the computer trading platform from a computing device associated with a first trader, an order for a bond instrument, wherein the computer trading platform comprises a server computing device and a database;

storing, by the computer trading platform, the order in the database;

transmitting, by the computer trading platform, the order to a computing device associated with each of the plurality of traders to notify the traders of the order;

matching, by the computer trading platform, the order using price and time priority with a first bid/offer received from a computing device associated with a second trader and a second bid/offer received from a computing device associated with a third trader, wherein the first bid/offer of the second trader has higher priority to trade over the second bid/offer of the third trader responsive to the price and time priority;

determining, by the computer trading platform, whether to initiate a workup period for the order between the first trader and the second trader responsive to triggering of predetermined workup conditions, wherein the workup conditions include size of the order, price of the order, size of the first bid/offer, price of the bid/offer, or any combination thereof;

initiating, by the computer trading platform, the workup period between the first trader and the second trader by transmitting a workup initiating transaction via the platform to the computing devices associated with the first and second traders;

enabling, by the computer trading platform, the first trader and the second trader to modify the matched order between the first trader and the second trader prior to the expiration of the workup period;

providing, by platform, an indicator to the first trader that at least part of the total size of the workup orders on the opposite side of the market belongs to the second trader;

providing, by platform, an indicator to the second trader that at least part of the total size of the workup orders on the opposite side of the market belongs to the first trader;

terminating, by the computer trading platform, the workup period;

when the workup period is terminated:

executing, by the computer trading platform, the order between the first trader and the second trader according to order parameters existing prior to initiation of the workup period;

if the full size of the second trader's bid/offer is satisfied and the size of the order is not exhausted, executing, by the computer trading platform, the order between the first trader and the third trader according to order parameters existing prior to initiation of the workup period; and if the full size of the third trader's bid/offer is satisfied and the size of the order is not exhausted, executing, by the computer trading platform, the order between the first trader and the second trader according to order parameters modified during the workup period.

2. The method of claim 1, wherein the matched order is modified during the workup period.

3. The method of claim 1, wherein the matched order is not modified during the workup period.

4. The method of claim 1, further comprising receiving, by the computer trading platform, an indication from at least one of the computing device associated with the first trader and the computing device associated with the second trader to convert the modified order size of the at least one of the first trader and the second trader to the order size.

5. The method of claim 1, further comprising generating, by the computer trading platform, activity log messages for workup order modification.

6. The method of claim 1, further comprising rejecting, by the computer trading platform, an order modification while the workup order is being executed.

7. The method of claim 1, further comprising matching, by the computer trading platform, the modified orders when the modified orders are received and prior to the expiration of the workup period.

8. The method of claim 1, further comprising decrementing, by the computer trading platform, the order sizes of the first trader and the second trader by the executed size every time there is an execution.

9. The method of claim 1, further comprising cancelling, by the computer trading platform, the workup order when a workup size of zero is received from at least one of the computing device associated with the first trader and the computing device associated with the second trader.

10. The method of claim 1, further comprising enabling, by the computer trading platform, the third user to modify the second bid/offer prior to the expiration of the workup period.

11. The method of claim 10, further comprising enabling, by the computer trading platform, the third trader to cancel the modified second bid/offer before the expiration of the workup period.

12. The method of claim 1, further comprising enabling, by the computer trading platform, the third user to modify the second bid/offer prior to the expiration of the workup period when the second bid/offer of the third trader is withdrawn.

13. The method of claim 1, further comprising triggering the workup period on a one-man locked market.

14. The method of claim 13, wherein when the full size of the one man locked market is executed in full on either side, the order on the opposite side of one man locked market is automatically held.

15. The method of claim 13, wherein the full size of either a bid or offer order of the one man locked market is executed in full.

16. A system for trading a plurality of different types of bond instruments among a plurality of traders, the system comprising:
  a server computing device configured to:
  receive, from a first trader, an order for a bond instrument;
  store the order in a database coupled to the server computing device;
  transmit the order to a computing device associated with each of the plurality of traders to notify the traders of the order;
  match the order using price and time priority with a first bid/offer received from a computing device associated with a second trader and a second bid/offer received from a computing device associated with a third trader, wherein the first bid/offer of the second trader has higher priority to trade over the second bid/offer of the third trader responsive to the price and time priority;
  determine whether to initiate a workup period for the order between the first trader and the second trader responsive to triggering of predetermined workup conditions, wherein the workup conditions include size of the order, price of the order, size of the first bid/offer, price of the bid/offer, or any combination thereof;
  initiate the workup period between the first trader and the second trader by transmitting a workup initiating transaction via the platform to the computing devices associated with the first and second traders;
  enable the first trader and the second trader to modify the matched order between the first trader and the second trader prior to the expiration of the workup period;
  provide an indicator to the first trader that at least part of the total size of the workup orders on the opposite side of the market belongs to the second trader;
  provide an indicator to the second trader that at least part of the total size of the workup orders on the opposite side of the market belongs to the first trader;
  terminate the workup period;
  when the workup period is terminated:
  execute the order between the first trader and the second trader according to order parameters existing prior to initiation of the workup period;
  if the full size of the second trader's bid/offer is satisfied and the size of the order is not exhausted, execute the order between the first trader and the third trader according to order parameters existing prior to initiation of the workup period; and
  if the full size of the third trader's bid/offer is satisfied and the size of the order is not exhausted, execute the order between the first trader and the second trader according to order parameters modified during the workup period.

17. The system of claim 16, wherein the matched order is modified during the workup period.

18. The system of claim 16, wherein the matched order is not modified during the workup period.

19. The system of claim 16, wherein the server computing device is further configured to receive an indication from at least one of the computing device associated with the first trader and the computing device associated with the second trader to convert the modified order size of the at least one of the first trader and the second trader to the order size.

20. The system of claim 16, wherein the server computing device is further configured to generate activity log messages for workup order modification.

21. The system of claim 16, wherein the server computing device is further configured to reject an order modification while the workup order is being executed.

22. The system of claim 16, wherein the server computing device is further configured to match the modified orders when the modified orders are received and prior to the expiration of the workup period.

23. The system of claim 16, wherein the server computing device is further configured to decrement the order sizes of the first trader and the second trader by the executed size every time there is an execution.

24. The system of claim 16, wherein the server computing device is further configured to cancel the workup order when a workup size of zero is received from at least one of the computing device associated with the first trader and the computing device associated with the second trader.

25. The system of claim 16, wherein the server computing device is further configured to enable the third user to modify the second bid/offer prior to the expiration of the workup period.

26. The system of claim 25, wherein the server computing device is further configured to enable the third trader to cancel the modified second bid/offer before the expiration of the workup period.

27. The system of claim 16, wherein the server computing device is further configured to enable the third user to modify the second bid/offer prior to the expiration of the workup period when the second bid/offer of the third trader is withdrawn.

28. The system of claim 16, wherein the server computing device is further configured to trigger the workup period on a one-man locked market.

29. The system of claim 28, wherein when the full size of the one man locked market is executed in full on either side, the order on the opposite side of one man locked market is automatically held.

30. The system of claim 16, wherein the full size of either a bid or offer order of the one man locked market is executed in full.

* * * * *

UNITED STATES PATENT AND TRADEMARK OFFICE
CERTIFICATE OF CORRECTION

| | | |
|---|---|---|
| PATENT NO. | : 8,392,314 B1 | Page 1 of 1 |
| APPLICATION NO. | : 12/698540 | |
| DATED | : March 5, 2013 | |
| INVENTOR(S) | : Daniel Epstein et al. | |

It is certified that error appears in the above-identified patent and that said Letters Patent is hereby corrected as shown below:

In the Claims:

Claim 1, Column 30, Line 5, after "by" add --the computer trading--

Claim 1, Column 30, Line 8, after "by" add --the computer trading--

Signed and Sealed this
Fourteenth Day of May, 2013

Teresa Stanek Rea
*Acting Director of the United States Patent and Trademark Office*